United States Patent
Tian et al.

(10) Patent No.: US 11,923,043 B2
(45) Date of Patent: *Mar. 5, 2024

(54) MEMORY INCLUDING CLOCK GENERATION CIRCUIT AND DUTY CYCLE ADJUSTMENT

(71) Applicant: CHANGXIN MEMORY TECHNOLOGIES, INC., Hefei (CN)

(72) Inventors: Kai Tian, Hefei (CN); Yuxia Wang, Hefei (CN)

(73) Assignee: CHANGXIN MEMORY TECHNOLOGIES, INC., Hefei (CN)

(*) Notice: Subject to any disclaimer, the term of this patent is extended or adjusted under 35 U.S.C. 154(b) by 206 days.

This patent is subject to a terminal disclaimer.

(21) Appl. No.: 17/448,891

(22) Filed: Sep. 26, 2021

(65) Prior Publication Data

US 2022/0130440 A1    Apr. 28, 2022

Related U.S. Application Data

(63) Continuation of application No. PCT/CN2021/106019, filed on Jul. 13, 2021.

(30) Foreign Application Priority Data

Oct. 28, 2020   (CN) ......................... 202011173788.8

(51) Int. Cl.
G11C 8/18    (2006.01)
G11C 7/22    (2006.01)
(Continued)

(52) U.S. Cl.
CPC .............. G11C 8/18 (2013.01); G11C 7/222 (2013.01); H03K 3/017 (2013.01); H03K 3/0322 (2013.01); *G11C 2207/2254* (2013.01)

(58) Field of Classification Search
None
See application file for complete search history.

(56) References Cited

U.S. PATENT DOCUMENTS 6,838,919 B1 * 1/2005 Kaviani ................. H03L 7/083
                                                        327/172
7,015,739 B2   3/2006 Lee
(Continued)

FOREIGN PATENT DOCUMENTS

CN   1542861 A   11/2004
CN   1675836 A    9/2005
(Continued)

OTHER PUBLICATIONS

Yyons2019, "Ring Oscillator Layout Design", https://maxbook118.com/html/2019/0901/6153212200002101,shtm, Sep. 2, 2019.
(Continued)

*Primary Examiner* — J. H. Hur
(74) *Attorney, Agent, or Firm* — Syncoda LLC; Feng Ma

(57) ABSTRACT

A memory includes: a clock generation circuit, configured to generate a first oscillation signal and a second oscillation signal. The first oscillation signal and the second oscillation signal have a same frequency but opposite phases, and a duty cycle of the first oscillation signal and a duty cycle of the second oscillation signal are both within a first preset range. The memory further includes a differential input circuit, which is configured to receive a first external signal and a second external signal, and generate a first internal signal and a second internal signal. The clock generation circuit is configured to monitor the duty cycle of the first internal signal or the duty cycle of the second internal signal, and enable the duty cycle of the first internal signal or the duty cycle of the second internal signal to be within a second preset range.

17 Claims, 11 Drawing Sheets

(51) Int. Cl.
 *H03K 3/017* (2006.01)
 *H03K 3/03* (2006.01)

(56) References Cited

U.S. PATENT DOCUMENTS

| | | | |
|---|---|---|---|
| 7,321,269 B2 | 1/2008 | Drake | |
| 7,501,870 B2 | 3/2009 | Choi | |
| 7,872,510 B2 | 1/2011 | Lee | |
| 8,106,697 B2* | 1/2012 | Chang | H03K 5/1565 327/175 |
| 8,154,352 B2 | 4/2012 | Ueno | |
| 9,030,244 B1 | 5/2015 | Luo | |
| 9,252,753 B2 | 2/2016 | Lin | |
| 9,270,256 B2 | 2/2016 | Lee | |
| 9,667,252 B1 | 5/2017 | Lee et al. | |
| 9,985,619 B2 | 5/2018 | Lee et al. | |
| 9,998,125 B2 | 6/2018 | Balamurugan et al. | |
| 10,241,537 B2 | 3/2019 | Li et al. | |
| 10,249,354 B1 | 4/2019 | Lee et al. | |
| 10,270,429 B1 | 4/2019 | Wang | |
| 10,411,675 B2 | 9/2019 | Kim et al. | |
| 10,418,983 B1 | 9/2019 | Lee | |
| 10,458,857 B2 | 10/2019 | Rachala et al. | |
| 10,601,410 B1 | 3/2020 | Satoh | |
| 10,630,273 B2 | 4/2020 | Tung et al. | |
| 10,700,672 B2 | 6/2020 | Savary et al. | |
| 10,784,846 B1 | 9/2020 | Bucossi | |
| 10,826,476 B1 | 11/2020 | Bucossi | |
| 10,862,460 B2 | 12/2020 | Kim et al. | |
| 10,958,256 B1 | 3/2021 | Lin | |
| 2002/0140477 A1* | 10/2002 | Zhou | H03K 5/1565 327/175 |
| 2004/0032300 A1 | 2/2004 | Joordens | |
| 2004/0189364 A1 | 9/2004 | Lee | |
| 2005/0007168 A1 | 1/2005 | Park | |
| 2005/0174156 A1* | 8/2005 | Wu | H03K 5/151 327/175 |
| 2007/0001724 A1* | 1/2007 | Na | H03L 7/10 327/158 |
| 2007/0018737 A1 | 1/2007 | Drake | |
| 2007/0046347 A1* | 3/2007 | Lee | H03L 7/087 327/158 |
| 2007/0090867 A1 | 4/2007 | Kim | |
| 2007/0241826 A1 | 10/2007 | Ueno | |
| 2007/0252629 A1* | 11/2007 | Boerstler | H03K 5/1565 327/175 |
| 2008/0024182 A1 | 1/2008 | Choi | |
| 2008/0024233 A1 | 1/2008 | Drake | |
| 2008/0197903 A1* | 8/2008 | Humble | H03K 5/1565 327/175 |
| 2008/0204094 A1 | 8/2008 | Hur | |
| 2009/0051443 A1 | 2/2009 | Illegems | |
| 2009/0115459 A1 | 5/2009 | Kwon | |
| 2009/0146700 A1* | 6/2009 | Kim | H03K 5/1565 327/144 |
| 2009/0302912 A1 | 12/2009 | Lee | |
| 2011/0102039 A1 | 5/2011 | Shin | |
| 2012/0075025 A1 | 3/2012 | Ueno | |
| 2015/0171836 A1 | 6/2015 | Lee | |
| 2015/0372665 A1 | 12/2015 | Tohidian et al. | |
| 2016/0006420 A1 | 1/2016 | Lin | |
| 2016/0072507 A1 | 3/2016 | Jia | |
| 2016/0241249 A1 | 8/2016 | Balamurugan et al. | |
| 2017/0117887 A1 | 4/2017 | Lee et al. | |
| 2017/0179956 A1 | 6/2017 | Lee et al. | |
| 2017/0194947 A1 | 7/2017 | Wei | |
| 2018/0358954 A1 | 12/2018 | Kim et al. | |
| 2018/0364752 A1 | 12/2018 | Li et al. | |
| 2019/0190501 A1 | 6/2019 | Wang et al. | |
| 2019/0215146 A1 | 7/2019 | Ke et al. | |
| 2019/0237127 A1 | 8/2019 | Moon et al. | |
| 2019/0257696 A1 | 8/2019 | Rachala et al. | |
| 2019/0280682 A1 | 9/2019 | Lee | |
| 2019/0334508 A1 | 10/2019 | Tang | |
| 2019/0348971 A1 | 11/2019 | Kim et al. | |
| 2020/0052681 A1 | 2/2020 | Tung et al. | |
| 2020/0136599 A1 | 4/2020 | Savary et al. | |
| 2020/0160902 A1 | 5/2020 | Gans | |
| 2020/0162066 A1 | 5/2020 | Gans | |
| 2020/0177172 A1 | 6/2020 | Satoh | |
| 2020/0195240 A1 | 6/2020 | Lim | |
| 2020/0336135 A1 | 10/2020 | Wang et al. | |
| 2021/0036690 A1 | 2/2021 | Tang | |
| 2021/0218388 A1 | 7/2021 | Wang et al. | |
| 2022/0130439 A1* | 4/2022 | Tian | G11C 7/222 |

FOREIGN PATENT DOCUMENTS

| | | |
|---|---|---|
| CN | 1956329 A | 5/2007 |
| CN | 101141129 A | 3/2008 |
| CN | 101409541 A | 4/2009 |
| CN | 101629978 A | 1/2010 |
| CN | 103684365 A | 3/2014 |
| CN | 104270122 A | 1/2015 |
| CN | 104716929 A | 6/2015 |
| CN | 104734697 A | 6/2015 |
| CN | 105099445 A | 11/2015 |
| CN | 105281757 A | 1/2016 |
| CN | 205385473 U | 7/2016 |
| CN | 106374890 A | 2/2017 |
| CN | 106888007 A | 6/2017 |
| CN | 106941344 A | 7/2017 |
| CN | 105281757 B | 7/2018 |
| CN | 108768385 A | 11/2018 |
| CN | 110266294 A | 9/2019 |
| CN | 110830011 A | 2/2020 |
| CN | 111103530 A | 5/2020 |
| CN | 111147055 A | 5/2020 |
| JP | 2006333184 A | 12/2006 |
| JP | 2008011132 A | 1/2008 |
| JP | 2010035106 A | 2/2010 |
| JP | 2020009309 A | 1/2020 |
| JP | 2020149759 A | 9/2020 |
| KR | 20080009855 A | 1/2008 |
| KR | 100998677 B1 | 12/2010 |
| WO | 2011077573 A1 | 6/2011 |

OTHER PUBLICATIONS

Zhang Tao et al, "Design of Low Noise Single Ended CMOS Ring Voltage controlled Oscillators", Microelectronics and Computing vol. 7 vol. 21 ISSN: 1000-7180, Jul. 31, 2004, p. 164-167.

Elad Alon, "Schematic and Layout Simulation Exercise", http://bwrcs.eecs.berkeley.edu/Classes/icdesign/ee141_f12/CurrentLabs/Lab%204.pdf, Sep. 23, 2009.

Kyu-hyoun Kim et al., "A 20-GB/s 256-Mb DRAM with an inductorless Quadrature PLL and a Cascaded Pre-emphasis Transmitter", in IEEE Journal of Solid-State Circuits, vol. 41, No. 1, Jan. 2006, pp. 127-134.

Takashi Kusaga et al., "Four-State Ring Oscillator for Quadrature Signal Generation", ICSES 2008 International Conference on Singnals and Electronic Systems Krakow, Sep. 14-17, 2008, pp. 89-92.

Zhou Shengming, "Integrated Circuit Design and Implementation Technology Based on ZENI", Xidian University Press, Oct. 31, 2013, p. 169, Figures 8-50.

Supplementary European Search Report in the European application No. 21856922.6, dated Nov. 2, 2022.

International Search Report in the international application No. PCT/CN2021/105207, dated Sep. 28, 2021.

International Search Report in the international application No. PCT/CN2021/112329, dated Oct. 29, 2021.

International Search Report in the international application No. PCT/CN2021/105250, dated Oct. 13, 2021.

International Search Report in the international application No. PCT/CN2021/106019, dated Oct. 20, 2021.

International Search Report in the international application No. PCT/CN2021/107942, dated Oct. 20, 2021.

International Search Report in the international application No. PCT/CN2021/118858, dated Dec. 2, 2021.

(56) References Cited

OTHER PUBLICATIONS

Supplementary European Search Report in the European application No. 21870482.3, dated Nov. 23, 2022.
Supplementary European Search Report in the European application No. 21870566.3, dated Dec. 9, 2022.
First Office Action of the Japanese application No. 2022-545877, dated Oct. 3, 2023. 6 pages with English translation.
First Office Action of the Japanese application No. 2022-552390, dated Oct. 17, 2023. 9 pages with English translation.
First Office Action of the U.S. Appl. No. 17/448,051, dated Oct. 13, 2023. 26 pages.

* cited by examiner

MEMORY INCLUDING CLOCK GENERATION CIRCUIT AND DUTY CYCLE ADJUSTMENT

CROSS-REFERENCE TO RELATED APPLICATIONS

This is a continuation of International Application No. PCT/CN2021/106019 filed on Jul. 13, 2021, which claims priority to Chinese Patent Application No. 202011173788.8 filed on Oct. 28, 2020. The disclosures of these applications are hereby incorporated by reference in their entirety.

BACKGROUND

A semiconductor memory is used in many electronic systems, so as to store retrievable data. As the demand for faster electronic systems, the greater data capacity and less power consumption is growing. In order to meet changing needs, the semiconductor memory may need to be faster, store more data and consume less power.

SUMMARY

The embodiments of the application relate to, but are not limited to, a memory.

Embodiments of the disclosure provide a memory, which includes: a clock generation circuit, configured to generate a first oscillation signal and a second oscillation signal, where the first oscillation signal and the second oscillation signal have a same frequency but opposite phases, and a duty cycle of the first oscillation signal and a duty cycle of the second oscillation signal are both within a first preset range; and a differential input circuit, configured to receive a first external signal and a second external signal, and generate a first internal signal and a second internal signal; herein, the clock generation circuit is further configured to monitor at least one of the duty cycle of the first internal signal or the duty cycle of the second internal signal, and enable the at least one of the duty cycle of the first internal signal or the duty cycle of the second internal signal to be into a second preset range.

The embodiments of the disclosure further provide a memory, which includes: a calibration circuit, configured to receive a first external signal and a second external signal, and generate a first internal signal and a second internal signal, where at least one of a duty cycle of the first internal signal or a duty cycle of the second internal signal are both within a third preset range; and a clock generation circuit, configured to generate a first oscillation signal and a second oscillation signal, where the first oscillation signal and the second oscillation signal have a same frequency but opposite phases; herein, the calibration circuit is further configured to adjust the at least one of the duty cycle of the first oscillation signal or the duty cycle of the second oscillation signal, and enable the at least one of the duty cycle of the first oscillation signal or the duty cycle of the second oscillation signal to be within a fourth preset range.

The embodiments of the disclosure further provide a memory, which includes: a clock generation circuit, configured to generate a first oscillation signal and a second oscillation signal, where the first oscillation signal and the second oscillation signal have a same frequency but opposite phases, and a duty cycle of the first oscillation signal and a duty cycle of the second oscillation signal are both within a fifth preset range; and a first external signal and a second external signal coming from the outside of the memory, where the duty cycle of the first external signal and the duty cycle of the second external signal are both within a sixth preset range; and a differential input circuit, configured to receive the first oscillation signal and the second oscillation signal, and output a first internal signal and a second internal signal in a test mode, and the differential input circuit is further configured to receive the first external signal and the second external signal, and output the first internal signal and the second internal signal in a normal operating mode; herein, the differential input circuit has data interaction with the clock generation circuit, so that at least one of the duty cycle of the first internal signal or the duty cycle of the second internal signal are both within a seventh preset range in the test mode or in the normal operating mode.

BRIEF DESCRIPTION OF THE DRAWINGS

One or more embodiments are exemplified by figures in the corresponding drawings, and the exemplary descriptions do not constitute a limitation to the embodiments of the disclosure. Elements in the drawings with the same reference numerals are denoted by similar elements, and unless otherwise stated, the drawings do not constitute a scale limitation.

DETAILED DESCRIPTION

In order to make the objectives, technical solutions and advantages of the embodiments of the disclosure clearer, each embodiment of the disclosure will be described below in combination with the drawings in detail. However, those of ordinary skill in the art may understand that, in each embodiment of the disclosure, many technical details will be proposed to make readers to better understand the disclosure. However, the technical solutions claimed by the disclosure may further be implemented even without these technical details and various variations and modifications made based on each of the following embodiments.

Typically, the semiconductor memory is controlled by providing commands, memory addresses and clocks to the memory; and furthermore, various commands, memory addresses and clocks may be provided by a memory controller. These three types of signals may control the memory to execute various storage operations, such as a reading operation for reading data from the memory, and a writing operation for storing data into the memory. Based on a known sequence related to a "related command" received by the memory, data can be transmitted between the memory and the memory controller. For example, a system clock for timing the commands and the addresses may be provided to the memory. Alternatively, a data clock may also be provided to the memory, and the data clock is used as a timing sequence of reading the data and a timing sequence of writing the data. Moreover, the memory may also provide a clock to the controller, as a timing sequence for transmitting the data to the controller. An external clock provided for the memory is configured to generate an internal clock, and the internal clock can control timing sequences of various internal circuits during a storage operation of the memory. The timing sequences of the internal circuits during the operation of the memory are critical, and the deviation of the internal clock may cause a wrong operation. The deviation of the clock may include a duty cycle distortion; that is, the duty cycle of a clock signal deviates from a preset duty cycle.

Therefore, the memory is required to have a Duty Cycle Adjust (DCA) function and a Duty Cycle Monitor (DCM) function. That is, the memory may include a DCA circuit and a DCM circuit, the DCA circuit may be configured to adjust the duty cycle of the internal clock generated by the external clock, and the DCM circuit may be configured to monitor whether the duty cycle of the clock deviates from the preset duty cycle.

Figure 1:
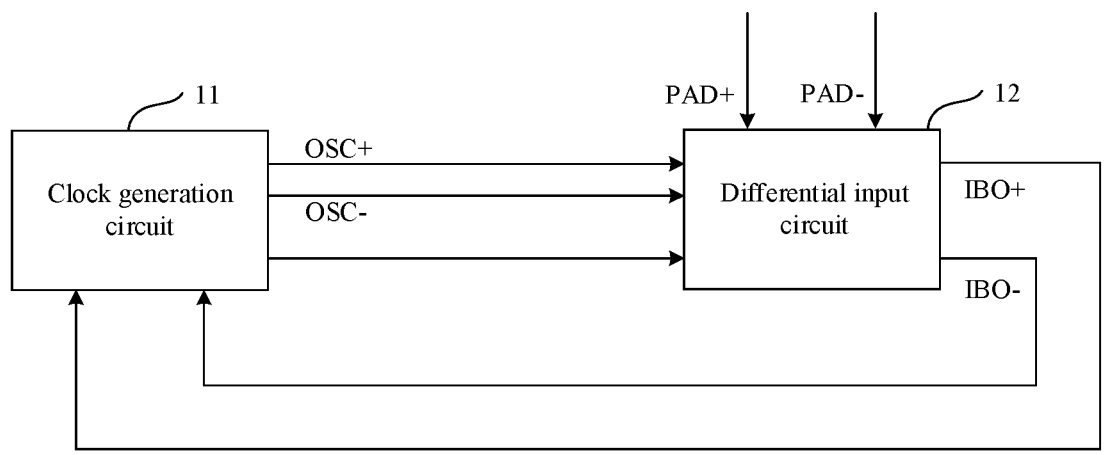
FIG. 1 is a functional block diagram of a memory according to an embodiment of the disclosure.
Figure 2:
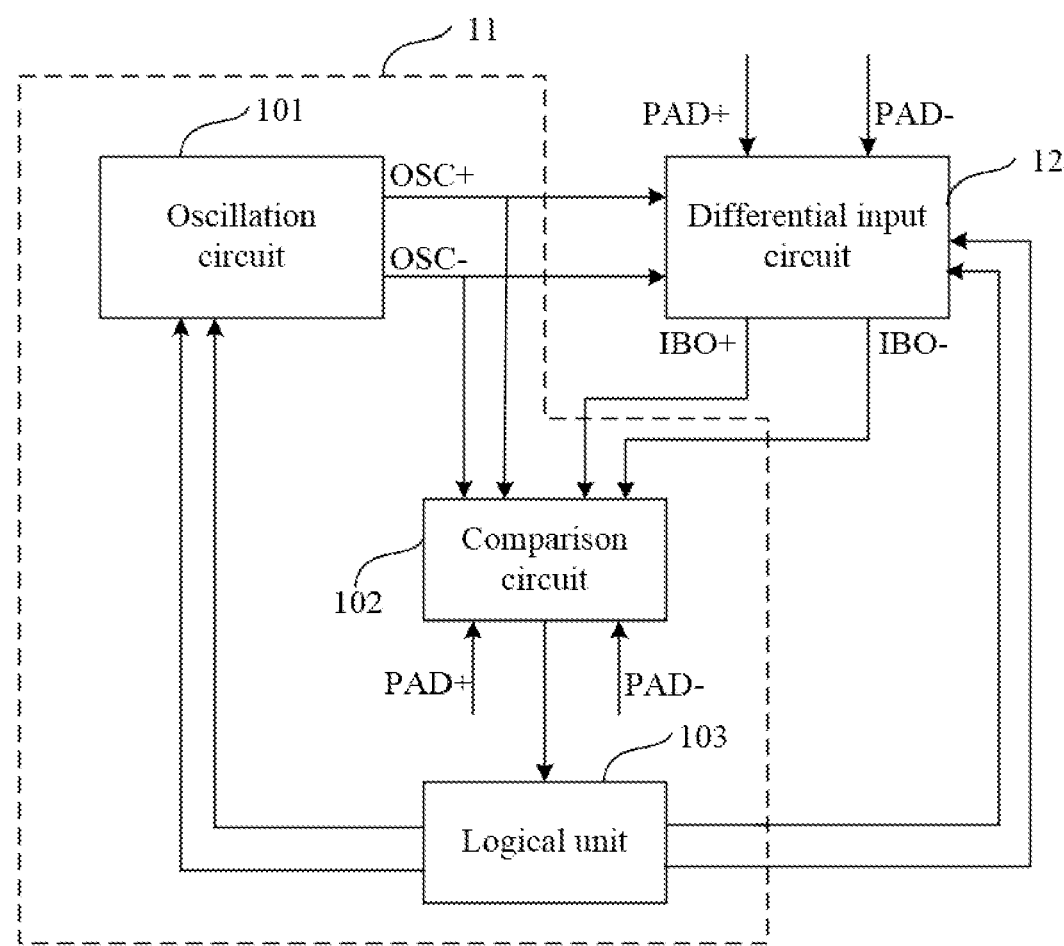
FIG. 2 is a functional block diagram of a memory according to another embodiment of the disclosure.
Figure 3:
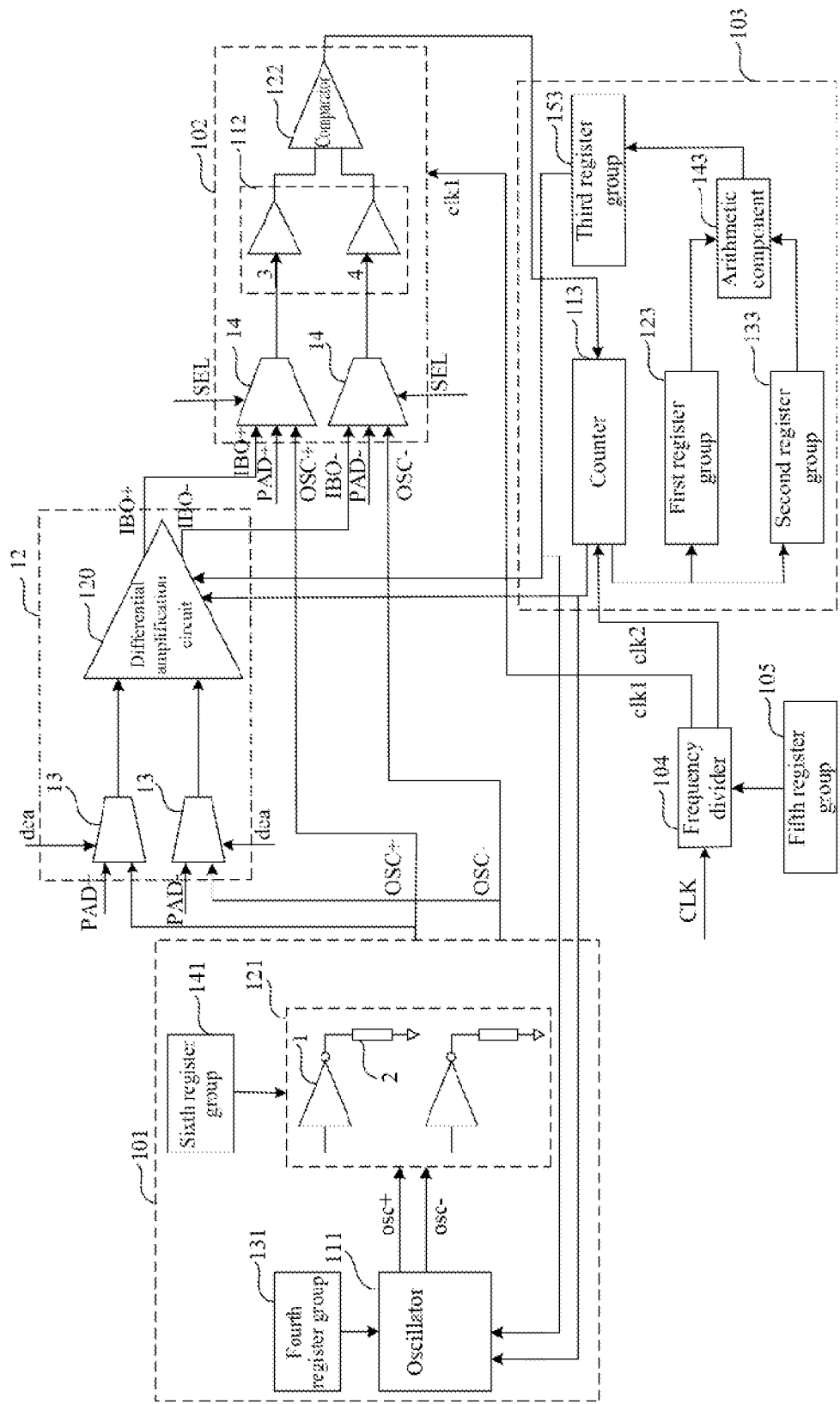
FIG. 3 is a schematic structural diagram of a memory according to an embodiment of the disclosure.

FIG. 1 is a functional block diagram of a memory according to an embodiment of the disclosure. FIG. 2 is a functional block diagram of a memory according to another embodiment of the disclosure. FIG. 3 is a schematic structural diagram of a memory according to an embodiment of the disclosure.

Referring to FIGS. 1 to 3, in the embodiments of the disclosure, a memory includes: a clock generation circuit 11, configured to generate a first oscillation signal OSC+ and a second oscillation signal OSC−, where the first oscillation signal OSC+ and the second oscillation signal OSC− have a same frequency but opposite phases, and a duty cycle of the first oscillation signal OSC+ and a duty cycle of the second oscillation signal OSC− are both within a first preset range. The memory further includes a differential input circuit 12, configured to receive a first external signal PAD+ and a second external signal PAD−, and generate a first internal signal IBO+ and a second internal signal IBO−. Herein, the clock generation circuit 11 is further configured to monitor at least one of a duty cycle of the first internal signal IBO+ or a duty cycle of the second internal signal IBO−, and enable the at least one of the duty cycle of the first internal signal IBO+ or the duty cycle of the second internal signal IBO− to be within a second preset range.

Referring to FIG. 3, the differential input circuit 12 may include a differential amplification circuit 120 and a second selector 13.

The memory has a Built-In Self Test (BIST) system, which uses the clock generation circuit 11 to generate differential high-speed oscillation signals (i.e., a high-frequency first oscillation signal OSC+ and a high-frequency second oscillation signal OSC−), which may be configured to test characteristics of a high-speed input circuit, so as to solve the problem of poor accuracy of a test results caused by too low frequency of an input signal provided by test equipment, and greatly reduce the dependence on Automatic Test Equipment (ATE), thereby reducing the test cost.

Moreover, the memory may further be configured to monitor the duty cycle of the first internal signal IBO+ and the duty cycle of the second internal signal IBO− output by the differential amplification circuit 120 by using the clock generation circuit 11, and control the differential amplification circuit 120, and enable the duty cycle of the first internal signal IBO+ and the second internal signal IBO− to be within the second preset range. Therefore, the memory may further be configured to achieve a DCA function and a DCM function.

The memory provided by the embodiment of the disclosure will be described in detail in combination with the drawings.

In an embodiment of the disclosure, the memory may be a Dynamic Random-Access Memory (DRAM), such as a LPDDR4 or a LPDDR5. In other embodiments, the memory may further be a Static Random-Access Memory (SRAM), a Magneto-resistive Random Access Memory (MRAM), a Ferroelectric Random Access Memory (FeRAM), a Phase Change Random Access Memory (PCRAM), a NAND, a NOR, etc.

The first oscillation signal OSC+ and the second oscillation signal OSC− may be differential clock signals. Moreover, in an embodiment of the disclosure, the first oscillation signal OSC+ and the second oscillation signal OSC− may have high-frequency characteristics. That is, the frequency of the first oscillation signal OSC+ and the frequency of the second oscillation signal OSC− may be equivalent to the frequency of a clock signal required for the memory for a reading and writing operation, and the equivalence here may mean that the frequencies are the same, or that the frequency difference is within an allowable range for the test. For example, the frequency of the first oscillation signal OSC+ and the frequency of the second oscillation signal OSC− may reach 3.2 GHz or 4.8 GHz, even 6.4 GHz.

In some embodiments, the clock generation circuit 11 may include: an oscillation circuit 101, configured to generate a first oscillation signal OSC+ and a second oscillation signal OSC−; and a comparison circuit 102, configured to receive the first oscillation signal OSC+ and the second oscillation signal OSC−, and compare the duty cycle of the first oscillation signal OSC+ with the duty cycle of the second oscillation signal OSC−. The clock generation circuit 11 may further include a logical unit 103, connected with the comparison circuit 102 and the oscillation circuit 101, and configured to control the oscillation circuit 101 according to an output result of the comparison circuit 102, so that the duty cycle of the first oscillation signal OSC+ and the duty cycle of the second oscillation signal OSC− are within the first preset range. The oscillation circuit 101 may include an oscillator 111, configured to generate a first initial oscillation signal OSC+ and a second initial oscillation signal OSC−, where the first initial oscillation signal OSC+ and the second initial oscillation signal OSC− may have a same frequency but opposite phases. That is, the first initial oscillation signal OSC+ and the second initial oscillation signal OSC− may be differential signals.

Referring to FIG. 3, the comparison circuit 102 may include a first selector 14, an integral unit 112 and a comparator 122.

Figure 4:
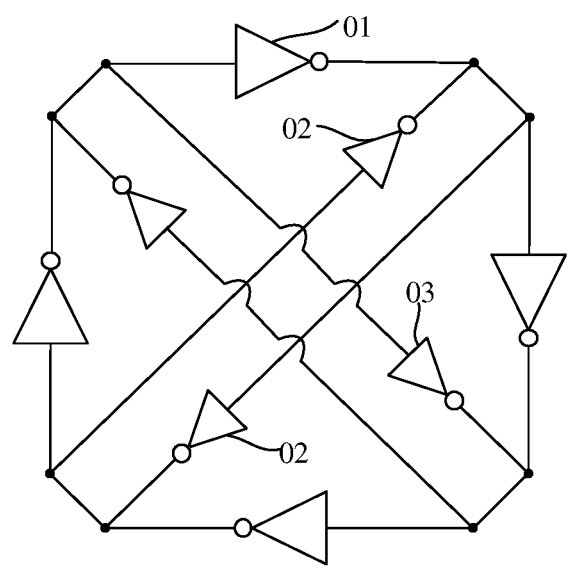
FIG. 4 is a schematic structural diagram of a circuit of an oscillator in FIG. 3.

FIG. 4 is a schematic structural diagram of a circuit of an oscillator 111 according to an embodiment of the disclosure. As shown in FIG. 4, the oscillator 111 may include a first ring topological structure and a second ring topological structure which are electrically connected with each other. The first ring topological structure may be connected end to end by a plurality of first phase inverters 01, to transmit the oscillation signal at a first transmission speed. And the second ring topological structure may be connected end to end by a plurality of second phase inverters 02, to transmit the oscillation signal at a second transmission speed. The second transmission speed may be less than the first transmission speed.

The number of the first phase inverters 01 may be an integer greater than or equal to 4, and the number of the second phase inverters 02 may be an integer greater than or equal to 2. Moreover, the second transmission speed may be greater than or equal to 0.5 times the first transmission speed.

The oscillator 111 may further include a third ring topological structure, which may be connected end to end by a plurality of third phase inverters 03, to transmit the oscillation signal at a third transmission speed. And the first ring topological structure may be electrically connected with the third ring topological structure, and the third transmission speed may be less than the first transmission speed. The number of the third phase inverters 03 may be an integer greater than or equal to 2, and the third transmission speed may be the same as the second transmission speed.

Compared with transmission of the oscillation signal only through the first ring topological structure, since the second transmission speed of the second ring topological structure is less than the first transmission speed of the first ring topological structure, the setting of the second ring topological structure may allow the oscillation signal to be inversed more times in a unit time. Thus, a high-speed first initial oscillation signal OSC+ and a high-speed second initial oscillation signal OSC− can be obtained, and then a high-speed first oscillation signal OSC+ and a high-speed second oscillation signal OSC− can be obtained.

Continuously referring to FIG. 3, the oscillation circuit 101 may further include a path analog circuit 121 arranged between the oscillator 111 and the comparison circuit 102. One terminal of the path analog circuit 121 may be connected with an output terminal of the oscillator 111, another terminal of the path analog circuit 121 may be connected with an input terminal of the comparison circuit 102, and the path analog circuit 121 may be configured to simulate circuit characteristics of a first path, receive the first initial oscillation signal OSC+ to generate the first oscillation signal OSC+, and receive the second initial oscillation signal OSC− to generate the second oscillation signal OSC−.

The circuit characteristics may include one or any combination of a device resistance, a device capacitance, a parasitic resistance, a parasitic capacitance, an input and output impedance, a driving capability and noise environment of the first path. The first path may refer to a signal path where a clock signal is transmitted to an output terminal of the differential amplification circuit of the memory through a controller. For ease of understanding and explanation, the first path will be described below in combination with FIG. 3.

Figure 5:
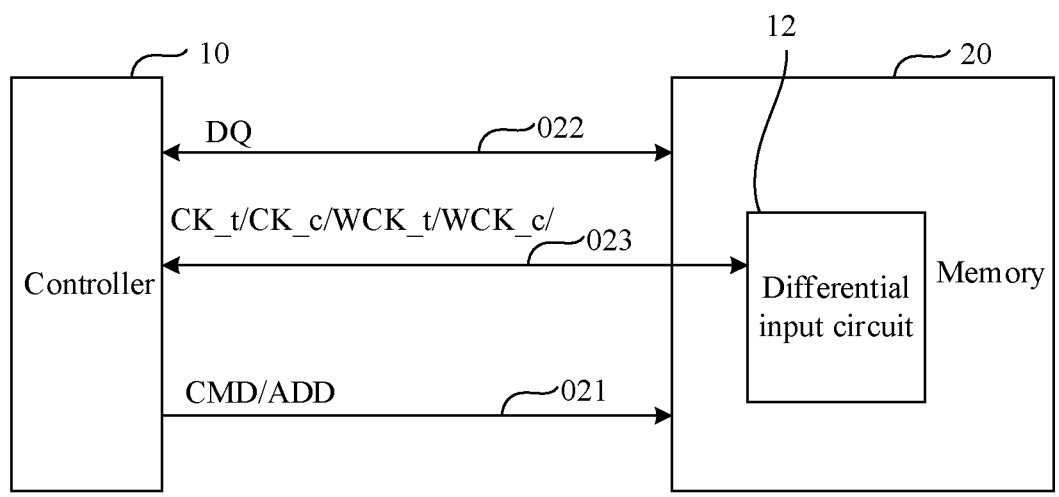
FIG. 5 is a schematic diagram of a memory system according to an embodiment of the disclosure.

FIG. 5 is a schematic diagram of a memory system according to an embodiment of the disclosure. Referring to FIG. 5, the memory system may include a controller 10 and a plurality of memories 20. Each of the memories 20 and the controller 10 may be coupled with a Command/Address (CMD/ADD) bus 021, a Data Queue (DQ) 022 and a clock bus (CK_t/CK_c/WCK_T and WCK_c) 023. For example, the memory 20 may be a LPDDR4, a LPDDR5 or a LPDDR6, the memory 20 may receive a CMD/ADD signal provided by the controller 10 through the CMD/ADD bus 021 and mark the CMD/ADD signal with CMD/ADD. A data signal may be transmitted, through a data bus 022, between the controller 10 and the memory 20, and the data signal may be marked with DQ. A variety of clock signals may be transmitted, through the clock bus 023, between the controller 10 and the memory 20. The clock signal may include a system clock signal and a reading-writing data clock signal, and a differential system clock signal may be marked with CK_t and CK_c, and a differential reading-writing data clock signal may be marked with WCK_t and WCK_c.

The controller 10 may be coupled with the memory 20 through the differential amplification circuit 120, the differential amplification circuit 120 may be configured to receive an external clock signal and generate an internal clock signal. The internal clock signal may be used as a differential input signal to complete the reading-writing operation of the data. The differential amplification circuit 120 may receive CK_t, CK_c, WCK_T and WCK_c, to generate an internal clock signal. The differential amplification circuit 120 may include an Input buffer (IB).

The CMD/ADD bus 021, the data bus 022 and the clock bus 023 may all have the resistance and may further be configured to generate a parasitic resistance or a parasitic capacitance. In addition, the differential amplification circuit 120 may further have circuit characteristics, such as a resistance or a capacitance. The path analog circuit 121 may be set in the oscillation circuit 101 to simulate the circuit characteristics. In an embodiment of the disclosure, by setting the path analog circuit 121 in the oscillation circuit, the path analog circuit 121 may not only amplify and output the first initial oscillation signal OSC+ and the second initial oscillation signal osc−, but also simulate the circuit characteristics from the controller 10 to an output terminal of the differential amplification circuit 120. Therefore, the first oscillation signal OSC+ and the second oscillation signal OSC− can be high-speed clock signals that are more in line with the real application scenario of the memory, and thus a test result will be more accurate and effective.

As shown in FIG. 3, the path analog circuit 121 may include an analog buffer 1 and an On Die Termination (ODT) 2.

Generally, when a high-speed test equipment is adopted to provide an input signal, in order to ensure the stability of the input signal, the level of the input signal is usually a fixed value and may not be changed at will, which is different from the actual application of the memory. Therefore, test deviation will be introduced, and the accuracy of the test result will be affected. However, in an embodiment of the disclosure, the first oscillation signal OSC+ and the second oscillation signal OSC− may be used as input signals, and the level of the first oscillation signal OSC+ and the level of the second oscillation signal OSC− may be adjusted through the path analog circuit 121, so that the test result will be more accurate.

It is to be noted that, in other embodiments, the oscillation circuit may further include merely an oscillator. That is, the oscillator may directly generate the first oscillation signal OSC+ and the second oscillation signal OSC−.

Continuously referring to FIG. 3, in an embodiment of the disclosure, the oscillation circuit 101 may further include a fourth register group 131, connected with the oscillator 111, and the fourth register group may be configured to configure the frequency of the first oscillation signal OSC+ and the frequency of the second oscillation signal OSC−. The fourth register group 131 may be configured to configure the frequency of the first oscillation signal OSC+ by configuring the frequency of the first initial oscillation signal OSC+, and also configure the frequency of the second oscillation signal OSC− by configuring the frequency of the second initial oscillation signal OSC−.

Herein, the fourth register group 131 may be a Mode Register (MR), which may further be integrated into an MR required by the memory to realize a function of the reading-writing operation. And the MR may further be a function module independent of the MR of the memory.

The oscillation circuit 101 may further include a sixth register group 141, connected with the path analog circuit 121, and the sixth register group may be configured to configure electrical parameters of the path analog circuit 121. The electrical parameters of the path analog circuit 121 may be adjusted by the sixth register group 141, so as to adjust the circuit characteristics of the first path simulated by the path analog circuit 121.

Herein, the sixth register group 141 may be an MR, which may also be integrated into the MR required by the memory to realize the function of the reading-writing operation. And the MR may further be the function module independent of the MR of the memory.

For example, an output state of the selected path analog circuit 121 may be set through the sixth register group 141. Taking LPDDR4 as an example, VOH=(1/3)*VDDQ or VOH=(1/2.5)*VDDQ, PDDS=40 ohm, ODT=40 ohm, where the VOH is an output driving voltage, the PDDS (Pull Down Drive Strength) is an input pull-down driving strength, and the ODT is an on-chip termination resistance.

Since the first oscillation signal OSC+ and the second oscillation signal OSC− are differential signals, the sum of the duty cycle of the first oscillation signal OSC+ and the duty cycle of the second oscillation signal OSC− may be 100%. And the duty cycle of the differential first oscillation signal OSC+ and the duty cycle of the differential second oscillation signal OSC− may be detected by setting the comparison circuit 102. The comparison circuit 102 may compare the at least one of the duty cycle of the first oscillation signal OSC+ or the duty cycle of the second oscillation signal OSC−, which may include at least one of the following three conditions.

The comparison circuit 102 may compare the duty cycle of the first oscillation signal OSC+. In some embodiments, the comparison circuit 102 may determine whether the duty cycle of the first oscillation signal OSC+ is within the first preset range, for example, the preset range may be 48%-52%. When the comparison circuit 102 determines that the duty cycle of the first oscillation signal OSC+ is within the first preset range, the duty cycle of the second oscillation signal OSC− may also be within the first preset range. And when the comparison circuit 102 determines that the duty cycle of the first oscillation signal OSC+ is not within the first preset range, the duty cycle of the second oscillation signal OSC− may also be not within the first preset range.

The comparison circuit 102 may compare the duty cycle of the second oscillation signal OSC−. In some embodiments, the comparison circuit 102 may determine whether the duty cycle of the second oscillation signal OSC− is within the first preset range, for example, the first preset range may be 48%-52%. When the comparison circuit 102 determines that the duty cycle of the second oscillation signal OSC− is within the first preset range, the duty cycle of the first oscillation signal OSC+ may also be within the first preset range. And when the comparison circuit 102 determines that the duty cycle of the second oscillation signal OSC− is not within the first preset range, the duty cycle of the first oscillation signal OSC+ may also not be within the first preset range.

The comparison circuit 102 may compare the duty cycle of the first oscillation signal OSC+ with the duty cycle of the first oscillation signal OSC+. In some embodiments, the comparison circuit 102 may determine whether a difference value between the duty cycle of the first oscillation signal OSC+ and the duty cycle of the second oscillation signal OSC− is within the first preset difference value range, which may be −4%-4%. When the comparison circuit 102 determines that the difference value is within the preset difference value range, the duty cycle of the first oscillation signal OSC+ and the duty cycle of the second oscillation signal OSC− may be both within the first preset range. Otherwise, the duty cycle of the first oscillation signal OSC+ and the duty cycle of the second oscillation signal OSC− may not reach the first preset range.

It should be noted that, both the numerical ranges of the aforementioned first preset range and the preset difference value range are exemplary descriptions. The embodiments may not limit the first preset range and the preset difference value range, and the first preset range and the preset difference value range may be reasonably set according to actual performance requirements of the memory.

In an embodiment of the disclosure, the comparison circuit 102 may include: an integral unit 112. The integral unit 112 may have a first input terminal 3 and a second input terminal 4. And the first input terminal 3 may receive one of the first oscillation signal OSC+ and the second oscillation signal OSC−, and the second input terminal 4 may receive another one of the first oscillation signal OSC+ and the second oscillation signal OSC−. The comparison circuit may further include a comparator 122, connected with an output terminal of the integral unit 112.

The integral unit 112 may include two integral circuits. Furthermore, the first input terminal 3 may be used as an input terminal of one of the integral circuits, and the second input terminal 4 may be used as an input terminal of another one of the integral circuits. The comparator 122 may be configured to compare the outputs of the two integral circuits, and then output a high level or a low level.

The comparison circuit 102 may perform an integral operation on the input first oscillation signal OSC+ and the second oscillation signal OSC− through the two integral circuits. Furthermore, a result of the integral operation may be input into the comparator 122, and the comparator 122 may output a comparison result.

For example, the first oscillation signal OSC+ may be taken as a positive terminal (duty+), and the second oscillation signal OSC− may be taken as a negative terminal (duty−). In one example, when the output of the comparator 122 is at the high level, the duty cycle of the first oscillation signal OSC+ may be greater than the duty cycle of the second oscillation signal OSC−. And when the output of the comparator 122 is at the low level, the duty cycle of the first oscillation signal OSC+ may be less than the duty cycle of the second oscillation signal OSC−.

It should be noted that, the aforementioned corresponding relationship among the output result of the comparison circuit 102, the duty cycle of the first oscillation signal OSC+ and the duty cycle of the second oscillation signal OSC− may merely be exemplary. The embodiments of the disclosure may not limit the corresponding relationship among the high level, the low level, the duty cycle of the first oscillation signal OSC+ and the duty cycle of the second oscillation signal OSC−, as long as it is ensured that different output results correspond to the different corresponding relationships between the duty cycle of the first oscillation signal OSC+ and the duty cycle of the second oscillation signal OSC−.

As shown in FIG. 3, the output result of the comparison circuit 102 may be sampled and output through a sampling clock clk1. In an embodiment of the disclosure, the comparison circuit 102 may be driven by the sampling clock clk1, and the frequency of the sampling clock clk1 may be lower than at least one of the frequency of the first oscillation signal OSC+ or the frequency of the second oscillation signal OSC−. The faster the frequency of the sampling clock clk1 is, the greater the sampling error will be. The slower the frequency of the sampling clock clk1 is, the smaller the sampling error will be, but the longer the test time will be. Therefore, the optimal frequency of the sampling clock clk1 may be comprehensively selected according to the sampling error and the test time.

In an embodiment of the disclosure, the clock generation circuit may further include a frequency divider 104, configured to receive an external clock signal CLK, and generate the sampling clock clk1. The external clock signal CLK may be provided by the test equipment or the memory.

Moreover, it can be seen from the foregoing analysis that, when the frequency of the sampling clock clk1 is adjustable, different frequencies of the sampling clock clk1 may be selected according to actual conditions. Therefore, in an embodiment of the disclosure, the clock generation circuit may further include a fifth register group 105, connected with the frequency divider 104, and the fifth register group may be configured to configure the frequency of the sampling clock. The fifth register group 105 may be an MR. A detailed description of the fifth register group 105 may be referred to the foregoing description of the fourth register group 131 and the sixth register group 141.

Since the inherent characteristics of the comparison circuit 102 may cause input deviation, in order to eliminate the error of the test result caused by the free input deviation of the comparison circuit 102. In an embodiment of the disclosure, the comparison circuit 102 may further be configured to allow the first input terminal and the second input terminal to be interchangeable. For example, the comparison circuit 102 may be configured as the following.

In response to an inversion identification signal being at a low level, the comparison circuit 102 may be configured to receive, through the first input terminal of the integral unit 112, the first oscillation signal OSC+ w; and in response to the inversion identification signal being at a high level, the comparison circuit 102 may be configured to receive, through the first input terminal of the integral unit 112, the second oscillation signal OSC−. In response to the inversion identification signal being at the low level, the comparison circuit 102 may be configured to receive, through the second input terminal of the integral unit 112, the oscillation signal OSC−; and in response to the inversion identification signal being at the high level, the comparison circuit 102 may be configured to receive, through the second input terminal of the integral unit 112, the first oscillation signal OSC+. Herein, the MR may be arranged in the memory, and the inversion identification signal may be provided by the MR, for example, it may be a DCM MR OP[1] in the LPDDR4, the LPDDR5 or the LPDDR6. When the DCM MR OP[1] is 0, it may indicate that the inversion identification signal is at the low level; and when the DCM MR OP[1] is 1, it may indicate that the inversion identification signal is at the high level.

The logical unit 103 may include: a counter 113, configured to adjust the at least one of the duty cycle of the first oscillation signal OSC+ or the duty cycle of the second oscillation signal OSC−; a first register group 123, configured to store a first value of the counter 113 according to an output of the comparator 122 in response to the inversion identification signal being at the low level; and a second register group 133, configured to store a second value of the counter 113 according to the output of the comparator 122 in response to the inversion identification signal being at the high level.

The counter 113 may have a function for adjusting the duty cycle of the first oscillation signal OSC+ and the duty cycle of the second oscillation signal OSC− output by the oscillation circuit 101. And the duty cycle of the first oscillation signal OSC+ and the duty cycle of the second oscillation signal OSC− may change monotonically. For example, the duty cycle may change from a minimum value to a maximum value, or from the maximum value to the minimum value in one counting cycle. In one counting cycle, the output result of the comparator 122 may have merely one inversion point, the value of the counter 113 corresponding to the inversion point may be set, to enable the duty cycle of the first oscillation signal OSC+ and the duty cycle of the second oscillation signal OSC− output by the oscillation circuit 101 to be the closest to the preset range. The value used as the value of the counter may be stored in the first register group 123 or the second register group 133.

When the inversion identification signal is at the low level, the first value of the counter 113 may be stored according to the output of the comparator 122, and the first value may be stored in the first register group 123. When the inversion identification signal is at the high level, the second value of the counter 113 may be stored according to the output of the comparator 122, and the second value may be stored in the second register group 133. In order to conveniently understand this, the operating principle of the logical unit 103 will be described in detail below.

When the inversion identification signal is at the low level, the first input terminal of the integral unit 112 may be configured to receive the first oscillation signal OSC+, and the second input terminal may be configured to receive the second oscillation signal OSC−. The counter 113 may start counting, for example, the counter 113 counts from 0 to 31 in one counting cycle. And meanwhile, the duty cycle of the first oscillation signal OSC+ and the duty cycle of the second oscillation signal OSC− output by the oscillation circuit 101 may also change from a minimum value to a maximum value (such as from 40% to 60%), or from a maximum value to a minimum value. Therefore, in one counting cycle (such as from 0 to 31), the comparator 122 may have merely one inversion point, the value of the counter 113 corresponding to the inversion point may be the first value, and the first value may be set, to enable the duty cycle of the oscillation signal output by the oscillator 111 through the path analog circuit 121 to be the closest to the first preset range. For example, the first value may be set, to enable the duty cycle to be the closest to 50%, and the first value to be stored in the first register group 123.

When the inversion identification signal is at the high level, the first input terminal of the integral unit 112 may be configured to receive the second oscillation signal OSC−, the second input terminal may be configured to receive the first oscillation signal OSC+. That is, the input terminals of the comparison circuit 102 may be interchangeable. The counter 113 may be configured to enter a new counting cycle; for example, the counter 113 may count from 0 to 31. And similarly, the second value of the counter 113 corresponding to the output inversion point of the comparator 122 may be stored in the second register group 133.

It should be noted that, the aforementioned counting cycle from 0 to 31 is merely exemplary description. The counting type of the counter 113 will not be limited in the embodiments of the disclosure. The counter 113 may be either an addition counter or a subtraction counter, which may implement a sequential increasing or decreasing counting, or a step-by-step increasing or decreasing counting, so that a monotonic change of the counter 113 in a single counting cycle can be ensured.

The first input terminal and the second input terminal of the comparison circuit 102 may be interchangeable. By controlling the oscillation circuit 101 through two counts, the adverse effect caused by the input deviation of the comparison circuit 102 may be eliminated, and the accuracy of the test result can further be improved.

Moreover, the logical unit 103 may further include: an arithmetic component 143, connected with the first register group 123 and the second register group 133, and the arithmetic component 143 may be configured to perform operations of addition, subtraction, multiplication and division on an output of the first register group 123 and the second register group 133; and a third register group 153, connected with the arithmetic component 143, and configured to store an output result of the arithmetic component 143.

Referring to FIG. 3, the third register group 153 and the counter 113 of the logical unit 103 are respectively connected with the oscillation circuit 101 through signal lines. The third register group 153 and the counter 113 of the logical unit 103 are respectively connected with the differential amplification circuit 120 through signal lines.

The output of the first register group 123 may refer to the first value stored in the first register group 123, and the output of the second register group 133 may refer to the second value stored in the second register group 133. In an embodiment of the disclosure, the arithmetic component 143 may add the first value and the second value, and then may divide them by 2, to obtain an average value. The average value may be used as the output result of the arithmetic component 143, and the average value may be stored in the third register group 153. Since the average value already eliminates the input deviation of the comparison circuit 102, the average value may be set, to enable the duty cycle of the first oscillation signal OSC+ and the duty cycle of the second oscillation signal OSC− output by the oscillation circuit 101 to be the closest to the first preset range. For example, the duty cycle of the first oscillation signal OSC+ and the duty cycle of the second oscillation signal OSC− may be the closest to 50%.

It should be understood that, the average value may be an integer rounded up by adding the first value and the second value, and then dividing the sum of the first value and the second value by 2, or an integer rounded down by adding the first value and the second value, and then dividing the sum of the first value and the second value by 2.

It should be noted that, in an embodiment of the disclosure, the average of the first value and the second value can be taken as an example, and in other embodiments, other calculation methods may also be used to calculate the first value and the second value.

The first register group 123, the second register group 133 and the third register group 153 may be MRs.

In an embodiment of the disclosure, the counter 113 may be driven by a calculator clock, and the frequency of the calculator clock may be lower than the at least one of the frequency of the first oscillation signal OSC+ or the frequency of the second oscillation signal OSC−. The frequency of the calculator clock may be adjustable, and the frequency of the calculator clock may be reasonably selected according to the speed for adjusting the oscillation circuit 101.

Moreover, the frequency of the sampling clock may be the same as the frequency of the calculator clock. The frequency divider may further be configured to receive an external clock signal, and generate the sampling clock and the calculator clock. And similarly, the fifth register group may further be configured to configure the frequency of the calculator clock.

The value stored in the third register group 153 may correspond to the setting of the oscillation circuit 101. And at the time, the duty cycle of the differential amplification circuit 120 may be selectively switched from the counter 113 to the third register group 153. Therefore, the oscillation circuit 101 may fixedly output the first oscillation signal OSC+ and the second oscillation signal OSC− at the optimal duty cycle. That is, both the duty cycle of the output first oscillation signal OSC+ and the duty cycle of the output second oscillation signal OSC− may be within the first preset range. It should be understood that, during a period that the oscillation circuit 101 fixedly outputs the first oscillation signal OSC+ and the second oscillation signal OSC− at the optimal duty cycle, the comparison circuit 102 may continuously compare the at least one of the duty cycle of the first oscillation signal OSC+ or the duty cycle of the second oscillation signal OSC−. And when the duty cycle of the first oscillation signal OSC+ and the duty cycle of the second oscillation signal OSC− depart from the preset range, the problem may be detected in time.

In an embodiment of the disclosure, the differential input circuit 12 may include an IB, configured to receive the differential first external signal PAD+ and the differential second external signal PAD−, and then output the differential first internal signal IBO+ and the differential second internal signal IBO−.

In an embodiment of the disclosure, the comparison circuit 102 may also be connected with an output terminal of the differential amplification circuit 120, and may compare at least one of the duty cycle of the first internal signal IBO+ or the duty cycle of the second internal signal IBO−. And the logical unit 103 may also be connected with the differential input circuit 12 and may control the differential amplification circuit 120 according to an output result of the comparison circuit 102. Therefore, at least one of the duty cycle of the first internal signal IBO+ or the duty cycle of the second internal signal IBO− may be within the second preset range.

The comparison circuit 102 may be configured to detect the duty cycle of the first internal signal IBO+ and the duty cycle of the second internal signal IBO−.

Since the first internal signal IBO+ and the second internal signal IBO− are differential signals, the sum of the duty cycle of the first internal signal IBO+ and the duty cycle of the second internal signal IBO− may be 100%, and the comparison circuit 102 may configured to detect the duty cycle of the differential first internal signal IBO+ and the duty cycle of the differential second internal signal IBO−. The operation that the comparison circuit 102 compares the at least one of the duty cycle of the first internal signal IBO+ or the duty cycle of the second internal signal IBO− may include at least one of the following three conditions.

The comparison circuit 102 may compare the duty cycle of the first internal signal IBO+. In some embodiments, the comparison circuit 102 may determine whether the duty cycle of the first internal signal IBO+ is within the second preset range, for example, the preset range may be 48%-

52%. When the comparison circuit 102 determines that the duty cycle of the first internal signal IBO+ is within the second preset range, the duty cycle of the second internal signal IBO− may also be within the second preset range. And when the comparison circuit 102 determines that the duty cycle of the first internal signal IBO+ is not within the second preset range, the duty cycle of the second internal signal IBO− may also be not within the second preset range.

The comparison circuit 102 may compare the duty cycle of the second internal signal IBO−. In some embodiments, the comparison circuit 102 may determine whether the duty cycle of the second internal signal IBO− is within the second preset range, for example, the preset range may be 48%-52%. When the comparison circuit 102 determines that the duty cycle of the second internal signal IBO− is within the second preset range, the duty cycle of the first internal signal IBO+ may also be within the second preset range. When the comparison circuit 102 determines that the duty cycle of the second internal signal IBO− is not within the second preset range, the duty cycle of the first internal signal IBO+ may also not be within the second preset range.

The comparison circuit 102 may compare the duty cycle of the first internal signal IBO+ with the duty cycle of the second internal signal IBO−. In some embodiments, the comparison circuit 102 may determine whether a difference value between the duty cycle of the first internal signal IBO+ and the duty cycle of the second internal signal IBO− is within a preset difference value range, and the preset difference value range may be −4%-4%. When the comparison circuit 102 determines that the difference value is within the preset difference value range, the duty cycle of the first internal signal IBO+ and the duty cycle of the second internal signal IBO− may be both within the second preset range. Otherwise, the duty cycle of the first internal signal IBO+ and the duty cycle of the second internal signal IBO− may not reach the second preset range.

It should be noted that, both the numerical ranges of the aforementioned second preset range and the preset difference value range are exemplary descriptions. The embodiments of the disclosure may not limit the second preset range and the preset difference value range, and the second preset range and the preset difference value range may be reasonably set according to actual performance requirements of the memory.

Correspondingly, the integral unit may further be configured to: receive, through the first input terminal 3, one of the first internal signal IBO+ and the second internal signal IBO−, and receive, through the second input terminal 3, another one of the first internal signal IBO+ and the second internal signal IBO−. The comparison circuit 102 may perform an integral operation on the input first internal signal IBO+ and the second internal signal IBO− through the two integral circuits. Furthermore, the result of the integral operation may be input into the comparator 122, and the comparator 122 may output a comparison result.

For example, the first internal signal IBO+ may be taken as a positive terminal (duty+), and the second internal signal IBO− may be taken as a negative terminal (duty-). In one example, when the output of the comparator 122 is at the high level, the duty cycle of the first internal signal IBO+ may be greater than the duty cycle of the second internal signal IBO−. And when the output of the comparator 122 is at the low level, the duty cycle of the first internal signal IBO+ may be less than the duty cycle of the second internal signal IBO−.

It should be noted that, the aforementioned corresponding relationship among the output result of the comparison circuit 102, the duty cycle of the first internal signal IBO+ and the duty cycle of the second internal signal IBO− may merely be exemplary. The embodiments of the disclosure may not limit the corresponding relationship among the high level, the low level, the duty cycle of the first internal signal IBO+ and the duty cycle of the second internal signal IBO−, as long as it is ensured that different output results correspond to the different corresponding relationships between the duty ratio of the first oscillation signal OSC+ and the duty ratio of the second oscillation signal OSC−.

Since the inherent characteristics of the comparison circuit 102 may cause input deviation, in order to eliminate the error of the test result caused by the free input deviation of the comparison circuit 102. In an embodiment of the disclosure, the comparison circuit 102 may further be configured to allow the first input terminal 3 and the second input terminal 4 to be interchangeable. The comparison circuit 102 may be configured as the following.

In response to an inversion identification signal being at a low level, the comparison circuit 102 may be configured to receive, through the first input terminal 3 of the integral unit 112, the first internal signal IBO+; and in response to the inversion identification signal being at a high level, the comparison circuit 102 may be configured to receive, through the first input terminal 3 of the integral unit 112, the second internal signal IBO−. In response to the inversion identification signal being at the low level, the comparison circuit 102 may be configured to receive, through the second input terminal 4 of the integral unit 112, the second internal signal IBO−; and in response to the inversion identification signal being at the high level, the comparison circuit 102 may be configured to receive, through the second input terminal 4 of the integral unit 112, the first internal signal IBO+. Herein, the MR may be arranged in the memory, and the inversion identification signal may be provided by the MR, for example, in a LPDDR4, a LPDDR5, or a LPDDR6. And the inversion identification signal may be defined as DCM MR OP[1], when the DCM MR OP[1] is 0, it may indicate that the inversion identification signal is at the low level, and when the DCM MR OP[1] is 1, it may indicate that the inversion identification signal is at the high level.

The logical unit 103 may be configured to control the differential amplification circuit 120 according to a detection result of the comparison circuit 102, and adjust circuit characteristics of the differential amplification circuit 120, so that the at least one of the duty cycle of the first internal signal IBO+ or the duty cycle of the second internal signal IBO− output by the adjusted differential amplification circuit 120 may be within the second preset range.

The counter 113 can further be configured to adjust the at least one of the duty cycle of the first internal signal IBO+, or the duty cycle of the second internal signal IBO−. The first register group 123 may be configured to store the first value of the counter 113 according to the output of the comparator 122 in response to the inversion identification signal being at the low level; and the second register group 133 may be configured to store the second value of the counter 113 according to the output of the comparator 122 in response to the inversion identification signal being at the high level.

Specifically, the counter 113 may also have the functions for adjusting the circuit characteristics of the differential amplification circuit 120 and changing the duty cycle of the first internal signal IBO+ and the duty cycle of the second internal signal IBO−. The duty cycle of the first internal signal IBO+ and the duty cycle of the second internal signal IBO− may change monotonically. For example, the duty cycle may change from a minimum value to a maximum value, or from the maximum value to the minimum value in one counting cycle. In one counting cycle, the output result of the comparator 122 may have merely one inversion point, the value of the counter 113 corresponding to the inversion point may be set, to enable the duty cycle of the first internal signal IBO+ and the duty cycle of the second internal signal IBO− output by the differential amplification circuit 120 to be the closest to the second preset range. The value used as the value of the counter 113 may be stored in the first register group 123 or the second register group 133.

When the inversion identification signal is at the low level, the first value of the counter 113 may be stored according to the output of the comparator 122, and the first value may be stored in the first register group 123. When the inversion identification signal is at the high level, the second value of the counter 113 may be stored according to the output of the comparator 122, and the second value may be stored in the second register group 133. In order to conveniently understand this, the operating principle of the logical unit 103 will be described in detail below.

When the inversion identification signal is at the low level, the first input terminal 3 of the integral unit 112 may be configured to receive the first internal signal IBO+, and the second input terminal 4 may be configured to receive the second internal signal IBO−. The counter 113 may start counting, for example, the counter 113 counts from 0 to 31 in one counting cycle. And meanwhile, the duty cycle of the first internal signal IBO+ and the duty cycle of the second internal signal IBO− output by the differential amplification circuit 120 may also change from a minimum value to a maximum value (such as from 40% to 60%), or from a maximum value to a minimum value. Therefore, in one counting cycle (such as from 0 to 31), the comparator 122 may have merely one inversion point, the value of the counter 113 corresponding to the inversion point may be the first value, and the first value may be set, to enable the duty cycle of the first internal signal IBO+ output by the differential amplification circuit 120 to be the closest to the second preset range. For example, the first value may be set, to enable the duty cycle to be the closest to 50%, and the first value to be stored in the first register group 123.

When the inversion identification signal is at the high level, the first input terminal 3 of the integral unit 112 may be configured to receive the second internal signal IBO−, the second input terminal 4 may be configured to receive the first internal signal IBO+. That is, the input terminals of the comparison circuit 102 may be interchangeable. The counter 113 may be configured to enter a new counting cycle, for example, the counter 113 may count from 0 to 31. And similarly, the second value of the counter 113 corresponding to the output inversion point of the comparator 122 may be stored in the second register group 133.

It should be noted that, the aforementioned counting cycle from 0 to 31 is merely exemplary description. The counting type of the counter 113 will not be limited in the embodiments of the disclosure. The counter 113 may be either an addition counter or a subtraction counter, which may implement a sequential increasing or decreasing counting, or a step-by-step increasing or decreasing counting, so that the monotonic change of the counter 113 in a single counting cycle can be ensured.

The first input terminal 3 and the second input terminal 4 of the comparison circuit 102 may be interchangeable. By controlling the differential amplification circuit 120 through two counts, the adverse effect caused by the input deviation of the comparison circuit 102 may be eliminated, and the accuracy of the test result can further be improved.

Moreover, the logical unit 103 may also include: an arithmetic component 143, connected with the first register group 123 and the second register group 133, and the arithmetic component 143 may be configured to perform operations of addition, subtraction, multiplication and division on an output of the first register group 123 and the second register group 133; and a third register group 153, connected with the arithmetic component 143, and configured to store an output result of the arithmetic component 143.

Referring to FIG. 3, the third register group 153 and the counter 113 of the logical unit 103 are respectively connected with the oscillation circuit 101 through signal lines. The third register group 153 and the counter 113 of the logical unit 103 are respectively connected with the differential amplification circuit 120 through signal lines.

The output of the first register group 123 may refer to the first value stored in the first register group 123, and the output of the second register group 133 may refer to the second value stored in the second register group 133. In an embodiment of the disclosure, the arithmetic component 143 may add the first value and the second value and then divide them by 2, to obtain an average value. The average value may be used as the output result of the arithmetic component 143, and the average value may be stored in the third register group 153. Since the average value already eliminates the input deviation of the comparison circuit 102, the average value may be set, to enable the duty cycle of the first internal signal IBO+ and the duty cycle of the second internal signal IBO− output by the differential amplification circuit 120 to be the closest to the second preset range. For example, the duty cycle of the first internal signal IBO+ and the duty cycle of the second internal signal IBO− may be the closest to 50%.

It should be understood that, the average value may be an integer rounded up by adding the first value and the second value and then dividing the sum of the first value and the second value by 2, or an integer rounded down by adding the first value and the second value and then dividing the sum of the first value and the second value by 2.

It should be noted that, in an embodiment of the disclosure, averaging of the first value and the second value can be taken as an example, and in other embodiments, other calculation methods may also be used to calculate the first value and the second value.

In an embodiment of the disclosure, the counter 113 may be driven by a calculator clock, and the frequency of the calculator clock may be lower than the at least one of the frequency of the first internal signal IBO+ or the frequency of the second internal signal IBO−. The frequency of the calculator clock may be adjustable, and the frequency of the calculator clock may be reasonably selected according to the speed for adjusting the differential amplification circuit 120.

Moreover, the frequency of the sampling clock may be the same as the frequency of the calculator clock. The frequency divider may further be configured to receive an external clock signal, and generate the sampling clock and the calculator clock. And similarly, the fifth register group may further be configured to configure the frequency of the calculator clock.

The value stored in the third register group 153 may correspond to the setting of the differential amplification circuit 120. And at the time, the duty cycle of the differential amplification circuit 120 may be selectively switched from the counter 113 to the third register group 153. Therefore, the differential amplification circuit may fixedly output the first internal signal IBO+ and the second internal signal IBO− at the optimal duty cycle. It should be understood that, during a period that the differential amplification circuit 120 fixedly outputs the first internal signal IBO+ and the second internal signal IBO− at the optimal duty cycle, the comparison circuit 102 may continuously compare the at least one of the duty cycle of the first internal signal IBO+ or the duty cycle of the second internal signal IBO−. And when the duty cycle of the first internal signal IBO+ and the duty cycle of the second internal signal IBO− depart from the second preset range, the problem may be detected in time.

In some embodiments, the differential input circuit 12 may further include a second selector 13. The first oscillation signal OSC+, the second oscillation signal OSC−, the first external signal PAD+ and the second external signal PAD− may be connected with the second selector. And the first oscillation signal OSC+ and the second oscillation signal OSC− may be taken as a first differential signal pair and the first external signal PAD+ and the second external signal PAD− may be taken as a second differential signal pair. The second selector 13 may be configured to select one of the first differential signal pair and the second differential signal pair to be input into the differential amplification circuit 120.

The differential amplification circuit 120 may further be configured to receive the differential first oscillation signal OSC+ and the differential second oscillation signal OSC−, and output the differential first internal signal IBO+ and the differential second internal signal IBO−. Since the differential amplification circuit 120 has the inherent circuit characteristics, even if the duty cycle of the first oscillation signal OSC+ and the duty cycle of the second oscillation signal OSC− are in the first preset range, the duty cycle of the first internal signal IBO+ and the duty cycle of the second internal signal IBO− obtained, after being output through the differential amplification circuit 120, may possibly deviate. Therefore, the comparison circuit 102 may be configured to detect the duty cycle of the first internal signal IBO+ and the duty cycle of the second internal signal IBO−, and then control the differential amplification circuit 120 according to a detection result. The principle related to a control method may be the same as the control principle of the foregoing differential amplification circuit 120 related to the first external signal PAD+ and the second external signal PAD−, which will not be elaborated herein.

The control terminal of the second selector 13 may be configured to receive a calibration enable signal dca. In response to the calibration enable signal dca being at a low level, the first external signal PAD+ and the second external signal PAD− may be input into the differential amplification circuit 120. In response to the calibration enable signal being at a high level, the first oscillation signal OSC+ and the second oscillation signal OSC− may be input into the differential amplification circuit 120.

In response to the calibration enable signal dca being at the high level, the memory may be configured to enter a duty cycle calibration state. And the duty cycles of the first oscillation signal OSC+ and the second oscillation signal OSC− within the first preset range may be input into the differential amplification circuit 120, so as to execute a duty cycle calibration or a duty cycle adjustment, thereby realizing the DCA function. In response to the calibration enable signal dca being at the low level, the memory may quit the duty cycle calibration state. And the first external signal PAD+ and the second external signal PAD− may be input into the differential amplification circuit 120, so as to execute the duty cycle detection or the duty cycle monitoring, thereby realizing the DCM function. Moreover, in response to the calibration enable signal dca being at the low level, the memory may also be in the duty cycle calibration state. The first external signal PAD+ and the second external signal PAD− may be input into the differential amplification circuit 120, to execute the duty cycle detection or the duty cycle monitoring. After that, the differential amplification circuit 120 may be adjusted to execute the duty cycle calibration or the duty cycle adjustment to realize the DCA function.

It should be noted that, in other embodiments, the second selector may further be configured as the following: in response to the calibration enable signal being at the high level, the first external signal PAD+ and the second external signal PAD− may be input into the differential amplification circuit, and in response to the calibration enable signal being at the low level, the first oscillation signal OSC+ and the second oscillation signal OSC− may be input into the differential amplification circuit.

In some embodiments of the disclosure, the comparison circuit 102 may further include a first selector 14. The first oscillation signal OSC+, the second oscillation signal OSC−, the first internal signal IBO+, the second internal signal IBO−, the first external signal PAD+ and the second external signal PAD− may be connected with the first selector 14. The first oscillation signal OSC+ and the second oscillation signal OSC− may be taken as a first differential signal pair, the first external signal PAD+ and the second external signal PAD− may be taken as a second differential signal pair, and the first internal signal IBO+ and the second internal signal IBO− may be taken as a third differential signal pair. The first selector 14 may be configured to select one of the first differential signal pair, the second differential signal pair and the third differential signal pair to be input into the comparator 122 through the integral unit 112.

The control terminal of the first selector 14 may be configured to receive a Select Enable Signal (SEL), and select one of the first differential signal pair, the second differential signal pair and the third differential signal pair based on the SEL to be input into the comparator 122 through the integral unit 112. When it is necessary to monitor the duty cycle of the first oscillation signal OSC+ and the duty cycle of the second oscillation signal OSC−, the first oscillation signal OSC+ and the second oscillation signal OSC− may be selected and input into the comparator 122 through the integral unit 112. When it is necessary to monitor the duty cycle of the first external signal PAD+ and the duty cycle of the second external signal PAD−, the first external signal PAD+ and the second external signal PAD− may be selected and input into the comparator 122 through the integral unit 112. And when it is necessary to monitor the duty cycle of the first internal signal IBO+ and the duty cycle of the second internal signal IBO−, the first internal signal IBO+ and the second internal signal IBO− may be selected and input into the comparator 122 through the integral unit 112.

In order to facilitate a deep understanding of the memory provided by the embodiments of the disclosure, the operating principle of the memory provided by the embodiments of the disclosure will be described in detail below.

The memory may be configured to enter a DCM state based on a DCM enable signal.

Based on the SEL, an external input differential signal (e.g., the first external signal PAD+ or the second external signal PAD−), an internal built-in high-speed differential signal (e.g., the first oscillation signal OSC+ or the second oscillation signal OSC−), or an internal differential signal (e.g., the first internal signal IBO+ or the second internal signal IBO−) may be selected as the input signal of the DCM. In the following, taking the selection of the internal built-in high-speed differential signal as an example, a DCM enable signal may have the corresponding level, the oscillator may start to operate, and the frequency to be calibrated may be selected by setting the fourth register group. The oscillator may be configured to generate a first initial oscillation signal and a second initial oscillation signal and then input them to the path analog circuit. And the sixth register group may be configured to control the path analog circuit, select the output state of the path analog circuit, and output the first oscillation signal OSC+ and the second oscillation signal OSC−.

Under the common control of the DCM enable signal and the SEL, the first oscillation signal OSC+ and the second oscillation signal OSC− may be selected to enter the comparison circuit 102.

The comparison circuit 102 may be configured to sample once in each sampling period and then output the comparison result, and the logical unit 103 may be configured to adjust the oscillation circuit based on the comparison result. And the value in the third register group may be used as the setting of the oscillation circuit, to ensure the output of the first oscillation signal OSC+ and the second oscillation signal OSC− with a duty cycle within the first preset range.

The SEL may be switched, to enable the first oscillation signal OSC+ and the second oscillation signal OSC− to be input into the differential amplification circuit 120 through the second selector 13 which may select one from two. Therefore, the first internal signal IBO+ and the second internal signal IBO− can be output, and the output of the differential amplification circuit 120 may be input into the comparator 122 through the first selector 14 which may select one from three. The comparator 122 may be configured to sample once in each sampling period and then output the comparison result. At the time, when only the DCM is performed, the comparison result at this time may be selected and output; and when the DCA is selected, it may be necessary to set the DCA enable signal, to allow the memory to enter the DCA state. The differential input circuit 12 may be controlled and adjusted, and the value in the third register group may be used as the setting of the differential amplification circuit 120, to ensure the output of the first internal signal IBO+ and the second internal signal IBO− with the duty cycle within the first preset range.

The above may be the DCM/DCM of the memory in the test mode, which may ensure that the differential amplification circuit 120 has an optimal setting.

The memory may quit the DCM/DCA state, the oscillation circuit 101 may be turned off, and the first external signal PAD+ and the second external signal PAD− may be input into the differential amplification circuit 120 through the second selector. The memory may enter the normal operating mode; correspondingly, the memory may further enter the DCM/DCA state again, to monitor and calibrate the duty cycle of the first internal signal IBO+ and the duty cycle of the second internal signal IBO−, which are generated according to the first external signal PAD+ and the second external signal PAD− through the differential amplification circuit. When only the duty cycle of the first internal signal IBO+ and the duty cycle of the second internal signal IBO− being monitored, the comparison result will be output; and when it is also necessary to calibrate the duty cycle of the first internal signal IBO+ and the second internal signal IBO−, the clock generation circuit 11 will control the differential amplification circuit 120 and adjust the circuit characteristics of the differential amplification circuit 120. Therefore, the duty cycle of the first internal signal IBO+ and the duty cycle of the second internal signal IBO− may be within the second preset range.

Figure 6:
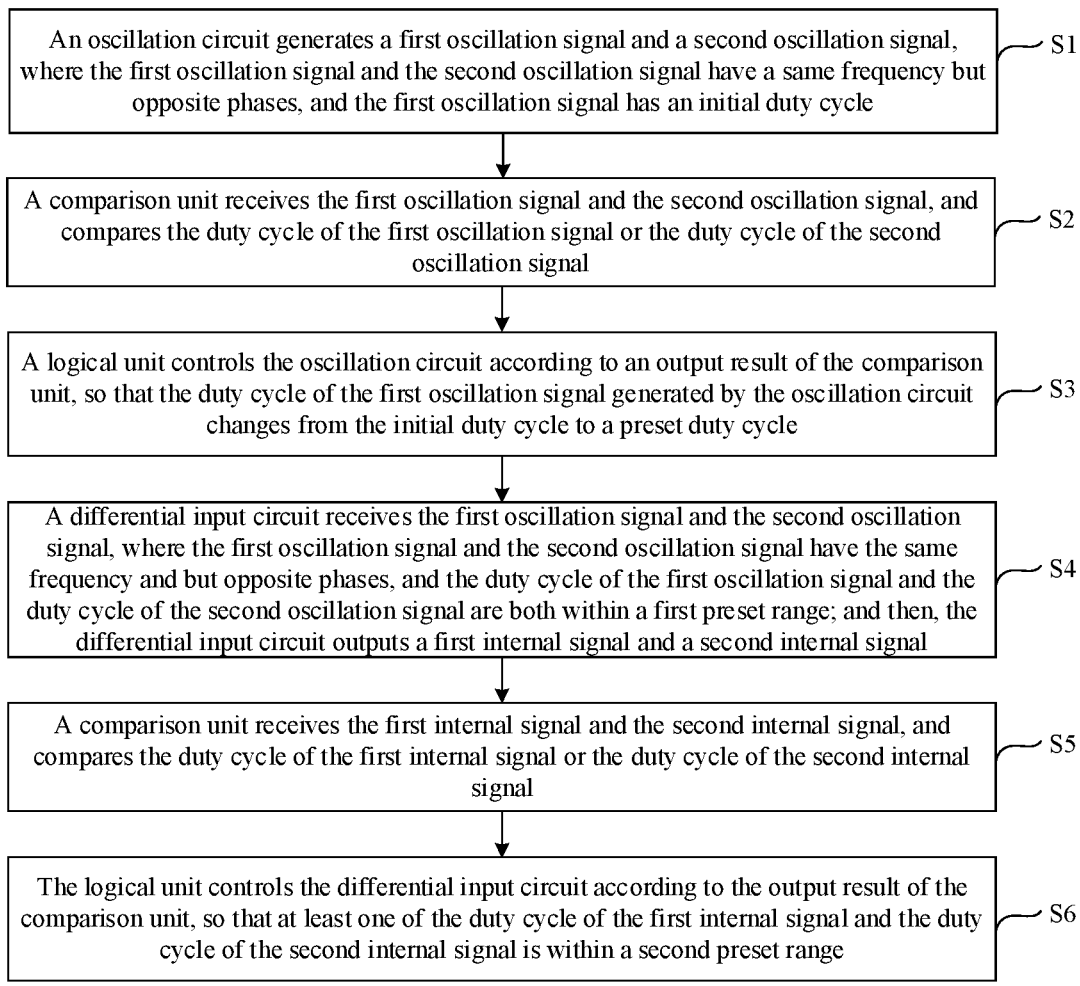
FIG. 6 is a schematic flowchart of operation steps of a memory according to an embodiment of the disclosure.

In order to further understand the clock duty cycle calibration function of the memory provided in the embodiments of the disclosure, the following will be described in detail in combination with the operation steps of the memory. FIG. 6 is a schematic flowchart of operation steps of a memory provided by an embodiment of the disclosure. In one example, the operation steps of the memory may include the following steps of S1 to S6.

In the step of S1, an oscillation circuit generates a first oscillation signal OSC+ and a second oscillation signal OSC−, where the first oscillation signal OSC+ and the second oscillation signal OSC− have a same frequency but opposite phases, and the first oscillation signal OSC+ have an initial duty cycle.

The initial duty cycle may be within a first preset range. For example, the initial duty cycle may be 48%-52%; the initial duty cycle may not be within the first preset range, (e.g., the initial duty cycle may be 45%). Moreover, a sum of the duty cycle of the first oscillation signal OSC+ and the duty cycle of the second oscillation signal OSC− may be 100%.

In the step of S2, a comparison circuit receives the first oscillation signal OSC+ and the second oscillation signal OSC−, and compares the duty cycle of the first oscillation signal OSC+ or the duty cycle of the second oscillation signal OSC−.

In response to an inversion identification signal being at a low level, the comparison circuit may compare the duty cycle of the first oscillation signal OSC+. For example, the comparison circuit may determine whether the duty cycle of the first oscillation signal OSC+ is equal to a preset duty cycle. When the duty cycle of the first oscillation signal OSC+ is less than the preset duty cycle, the comparison circuit may output a low level. When the duty cycle of the first oscillation signal OSC+ is greater than or equal to the preset duty cycle, the comparison circuit may output a high level. In response to an inversion identification signal being at a high level, the comparison circuit may compare the duty cycle of the second oscillation signal OSC−. For example, the comparison circuit may determine whether the duty cycle of the second oscillation signal OSC− is equal to the preset duty cycle. When the duty cycle of the second oscillation signal OSC− is less than the preset duty cycle, the comparison circuit may output a low level. And when the duty cycle of the second oscillation signal OSC− is greater than or equal to the preset duty cycle, the comparison circuit may output a high level. The preset duty ratio may be 50%. The output of the comparison circuit will not limit the corresponding relationship among the high level, the low level, the duty ratio of the first oscillation signal OSC+ and the duty ratio of the second oscillation signal OSC−, as long as it is ensured that different output results correspond to the different corresponding relationships between the duty ratio of the first oscillation signal OSC+ and the duty ratio of the second oscillation signal OSC−.

The output result of the comparison circuit may also represent a difference value between the duty cycle of the first oscillation signal OSC+ and the duty cycle of the second oscillation signal OSC−. For example, in response to the output result of the comparison circuit being at a high level, it may indicate that the duty cycle of the first oscillation signal OSC+ is greater than the duty cycle of the second oscillation signal OSC−; and in response to the output result of the comparison circuit being at a low level, it may indicate that the duty cycle of the first oscillation signal OSC+ is less than the duty cycle of the second oscillation signal OSC−. The sum of the duty cycle of the first oscillation signal OSC+ and the duty cycle of the second oscillation signal OSC− may be 100%. For example, when the duty cycle of the first oscillation signal OSC+ changes from 49% to 51%, the output result of the comparison circuit may change from the low level to the high level.

The comparison circuit may include: an integral unit, having a first input terminal and a second input terminal. The first input terminal may receive one of the first oscillation signal OSC+ and the second oscillation signal OSC−, and the second input terminal may receive another one of the second oscillation signal OSC− and the first oscillation signal OSC+. And the comparison circuit may further include a comparator, connected to an output terminal of the integral unit.

In response to an inversion identification signal being at the low level, the first input terminal may receive the first oscillation signal OSC+ and the second input terminal may receive the second oscillation signal OSC−. And the comparator may compare the duty cycle of the first oscillation signal OSC+, and the comparator may have a corresponding output. The operation that the comparator compares the duty cycle of the first oscillation signal OSC+ may be that: the duty cycle of the first oscillation signal OSC+ and the duty cycle of the second oscillation signal OSC− may be compared, or the duty cycle of the first oscillation signal OSC+ and a preset duty cycle may be compared.

In response to an inversion identification signal being at the high level, the first input terminal may receive the second oscillation signal OSC− and the second input terminal may receive the first oscillation signal OSC+. And the comparator may compare the duty cycle of the second oscillation signal OSC− and the comparator may have the corresponding output. The operation that the comparator compares the duty cycle of the second oscillation signal OSC− may be that: the duty cycle of the second oscillation signal OSC− and the duty cycle of the first oscillation signal OSC+ may be compared, or the duty cycle of the second oscillation signal OSC− and the preset duty cycle may be compared.

In the step of S3, a logical unit controls the oscillation circuit according to an output result of the comparison circuit, so that the duty cycle of the first oscillation signal OSC+ generated by the oscillation circuit changes from an initial duty cycle to a preset duty cycle.

The preset duty cycle may be within the first preset range. In some embodiments, the logical unit may include a counter, a first register group and a second register group. The oscillation circuit may be controlled through the counter, so that the duty cycle of the first oscillation signal OSC+ and the duty cycle of the second oscillation signal OSC− will be adjusted.

In response to an inversion identification signal being at a low level, the counter may count from M to N. When the value of the counter is M, the duty cycle corresponding to the first oscillation signal OSC+ may be P %, when the value of the counter is N, the duty cycle corresponding to the first oscillation signal OSC+ may be Q %, and when the output result of the comparison circuit changes from the low level to the high level, the counter value corresponding to the counter at this time will be stored in the first register group. For example, M may be 0, N may be 31, P may be 45, Q may be 55, and the initial duty cycle may be 45%, or other values.

In response to an inversion identification signal being at a high level, the counter may count from M to N. When the value of the counter is M, the duty cycle corresponding to the second oscillation signal OSC− may be Q %, when the value of the counter is N, the duty cycle corresponding to the second oscillation signal OSC− may be P %, and when the output result of the comparison circuit changes from the high level to the low level, the counter value corresponding to the counter at this time will be stored in the second register group. For example, M may be 0, N may be 31, P may be 45, Q may be 55, and the initial duty cycle may be 45%, or other values.

Both M and N are integers, M is less than N, both P and Q are positive integers, P is less than 50, and Q is greater than 50. The initial duty cycle may be any value from 1% to 99%, the preset duty cycle may be any value from 48% to 52%, or even the preset duty cycle may be equal to 50%.

In response to an inversion identification signal being at the low level, the first input terminal may receive the first oscillation signal OSC+ and the second input terminal may receive the second oscillation signal OSC−, and the counter may count from 0 to 31 in one counting cycle. When the output result of the comparison circuit is at a low level, it may indicate that the duty cycle of the first oscillation signal OSC+ is less than the duty cycle of the second oscillation signal OSC−; and when the output result of the comparison circuit is at a high level, it may indicate that the duty cycle of the first oscillation signal OSC+ is greater than the duty cycle of the second oscillation signal OSC−. Therefore, the output result of the comparison circuit may jump from the low level to the high level, corresponding to an inversion point; and the counter value of the counter corresponding to the inversion point used as the first value may be stored in the first register group.

In response to an inversion identification signal being at a high level, the first input terminal may receive the second oscillation signal OSC− and the second input terminal may receive the first internal signal IBO+, the counter may count from 0 to 31 in one counting cycle. When the output result of the comparison circuit is at a high level, it may indicate that the duty cycle of the first oscillation signal OSC+ is less than the duty cycle of the second oscillation signal OSC−; and when the output result of the comparison circuit is at a low level, it may indicate that the duty cycle of the first internal signal IBO+ is greater than the duty cycle of the second oscillation signal OSC−. Therefore, the output result of the comparison circuit may jump from the high level to the low level, corresponding to an inversion point; and the counter value of the counter corresponding to the inversion point used as the second value may be stored in the second register group.

It should be noted that, when the inversion identification signal is at the low level, the counter may count from 0 to 31, and the duty cycle of the first oscillation signal OSC+ may change monotonically (e.g., the duty cycle of the first oscillation signal OSC+ may increase in a preset step-by-step manner). For example, if the counter value of the counter increases by 1, the duty cycle of the first oscillation signal OSC+ may increase by ((55−45)/32)%. In a similar way, when the inversion identification signal is at the high level, the counter may count from 0 to 31, and the duty cycle of the second oscillation signal OSC− may change monotonically (e.g. the duty cycle of the first oscillation signal OSC+ may increase in the preset step-by-step manner). For example, if the counter value of the counter increases by 1, the duty cycle of the second oscillation signal OSC− may increase by ((55−45)/32)%.

The logical unit may further include an arithmetic component and a third register group. The arithmetic component may perform operations of addition, subtraction, multiplication and division on an output of the first register group and the second register group, and may store the obtained numerical value L in the third register group. Herein, L may be a positive integer, and L may be greater than or equal to M and less than or equal to N.

In an embodiment of the disclosure, the numerical value L may be the sum of the first value and the second value divided by 2; that is, the numerical value L may be an average of the first value and the second value. And the numerical value L may be the setting corresponding to the first oscillation signal OSC+ and the second oscillation signal OSC− output by the oscillation circuit reaching the preset range. In other words, the duty cycle of the first oscillation signal OSC+ corresponding to the numerical value L may be within the preset duty cycle, and the preset duty cycle may be 48%-52%, such as 50%.

After the numerical value L being obtained, the oscillation circuit may be no longer controlled by the counter, but the numerical value L may be used as the setting of the oscillation circuit. Therefore, the oscillation circuit may output the first oscillation signal OSC+ with a preset duty cycle, and the corresponding second oscillation signal OSC− may also be an oscillation signal whose duty cycle meets the requirements.

In the step of S4, a differential amplification circuit receives the first oscillation signal OSC+ and the second oscillation signal OSC−, where the first oscillation signal OSC+ and the second oscillation signal OSC− have the same frequency but opposite phase, and the duty cycle of the first oscillation signal OSC+ and the duty cycle of the second oscillation signal OSC− are within the first preset range. And the differential amplification circuit outputs a first internal signal IBO+ and a second internal signal IBO−.

The first oscillation signal OSC+ and the second oscillation signal OSC− may be signals with a steady duty cycle. And for example, both the duty cycle of the first oscillation signal OSC+ and the duty cycle of the second oscillation signal OSC− may be 50%.

In the step of S5, the comparison circuit receives the first internal signal IBO+ and the second internal signal IBO−, and compares the duty cycle of the first internal signal IBO+ or the duty cycle of the second internal signal IBO−.

The duty cycle of the first internal signal IBO+ and the duty cycle of the second internal signal IBO− output by the differential amplification circuit may be deviated. For example, the duty cycle of the first internal signal IBO+ may become 40%, and the duty cycle of the second internal signal IBO− may become 60%.

In response to an inversion identification signal being at the low level, the comparison circuit may compare the duty cycle of the first internal signal IBO+, and in response to an inversion identification signal being at the high level, the comparison circuit may compare the duty cycle of the second internal signal IBO−.

The comparison circuit may include: an integral unit, having a first input terminal and a second input terminal. The first input terminal may receive one of the first internal signal IBO+ and the second internal signal IBO−, and the second input terminal may receive another one of the second internal signal IBO− and the first internal signal IBO+. And the comparison circuit may further include a comparator, connected to an output terminal of the integral unit.

In response to an inversion identification signal being at the low level, the first input terminal may receive the first internal signal IBO+ and the second input terminal may receive the second internal signal IBO−. And the comparator may compare the duty cycle of the first internal signal IBO+ and the comparator may have a corresponding output. The operation that the comparator compares the duty cycle of the first internal signal IBO+ may be that: the duty cycle of the first internal signal IBO+ and the duty cycle of the second internal signal IBO− may be compared, or the duty cycle of the first internal signal IBO+ and the preset duty cycle may be compared.

In response to an inversion identification signal being at the high level, the first input terminal may receive the second internal signal IBO− and the second input terminal may receive the first internal signal IBO+. And the comparator may compare the duty cycle of the second internal signal IBO− and the comparator may have the corresponding output. The operation that the comparator compares the duty cycle of the second internal signal IBO− may be that: the duty cycle of the second internal signal IBO− and the duty cycle of the first internal signal IBO+ may be compared, or the duty cycle of the second internal signal IBO− and the preset duty cycle may be compared.

The output result of the comparison circuit may represent a difference value between the duty cycle of the first internal signal IBO+ and the duty cycle of the second internal signal IBO−. For example, in response to the output result of the comparison circuit being at the high level, it may indicate that the duty cycle of the first internal signal IBO+ is greater than the duty cycle of the second internal signal IBO−; and in response to the output result of the comparison circuit being at a low level, it may indicate that the duty cycle of the first internal signal IBO+ is less than the duty cycle of the second internal signal IBO−.

In the step of S6, the logical unit controls the differential amplification circuit according to the output result of the comparison circuit, so that the at least one of the duty cycle of the first internal signal IBO+ or the duty cycle of the second internal signal IBO− is within the second preset range.

The logical unit may include a counter, a first register group and a second register group. The differential amplification circuit may be controlled through the counter, so that the duty cycle of the first internal signal IBO+ and the duty cycle of the second internal signal IBO− can be adjusted.

In response to an inversion identification signal being at the low level, the counter may count from U to V. When the value of the counter is U, the duty cycle corresponding to the first internal signal IBO+ may be X %, when the value of the counter is V, the duty cycle corresponding to the first internal signal IBO+ may be Y %, and when the output result of the comparison circuit changes from the low level to the high level, the counter value corresponding to the counter at this time will be stored in the first register group. For example, U may be 0, V may be 7, X may be 40, and Y may be 60%.

In response to an inversion identification signal being at the high level, the counter may count from U to V. When the value of the counter is U, the duty cycle corresponding to the second internal signal IBO− may be Y %, when the value of the counter may be V, the duty cycle corresponding to the second internal signal IBO− may be X %, and when the output result of the comparison circuit changes from the high level to the low level, the counter value corresponding to the counter at this time will be stored in the second register group. For example, U may be 0, V may be 7, X may be 40, and Y may be 60%.

For example, in response to an inversion identification signal being at the low level, the first input terminal may receive the first internal signal IBO+ and the second input terminal may receive the second internal signal IBO−, and the counter may count from 0 to 7 in one counting cycle. When the output result of the comparison circuit is at a low level, it may indicate that the duty cycle of the first internal signal IBO+ is less than the duty cycle of the second internal signal IBO−; and when the output result of the comparison circuit is at a high level, it may indicate that the duty cycle of the first internal signal IBO+ is greater than the duty cycle of the second internal signal IBO−. Therefore, the output result of the comparison circuit may jump from the low level to the high level, corresponding to an inversion point; for example, the value of the counter at this time may be 3, and the counter value 3 of the counter corresponding to the inversion point used as the first value may be stored in the first register group.

For example, in response to an inversion identification signal being at the high level, the first input terminal may receive the second internal signal IBO− and the second input terminal may receive the first internal signal IBO+, the counter may count from 0 to 7 in one counting cycle. When the output result of the comparison circuit is at the high level, it may indicate that the duty cycle of the first internal signal IBO+ is less than the duty cycle of the second internal signal IBO−; and when the output result of the comparison circuit is at the low level, it may indicate that the duty cycle of the first internal signal IBO+ is greater than the duty cycle of the second internal signal IBO−. Therefore, the output result of the comparison circuit may jump from the high level to the low level, corresponding to an inversion point; for example, the value of the counter at this time may be 4, and the counter value 4 of the counter corresponding to the inversion point used as the second value may be stored in the second register group.

It is to be noted that, when the inversion identification signal is at the low level, the counter may count from 0 to 7, and the duty cycle of the first internal signal IBO+ may change monotonically (e.g., the duty cycle of the first internal signal IBO+ may increase in a preset step-by-step manner). And if the counter value of the counter increases by 1, the duty cycle of the first internal signal IBO+ may increase by ((60−40)/8)%. In a similar way, when the inversion identification signal is at the high level, the counter may count from 0 to 7, and the duty cycle of the second internal signal IBO− may change monotonically (e.g., the duty cycle of the first internal signal IBO+ may increase in the preset step-by-step manner). And if the counter value of the counter increases by 1, the duty cycle of the first internal signal IBO+ may increase by ((60−40)/8)%.

The logical unit may further include an arithmetic component and a third register group. The arithmetic component may perform operations of addition, subtraction, multiplication and division on an output of the first register group and the second register group, and may store the obtained numerical value H in the third register group. Herein, H may be a positive integer, and H may be greater than or equal to U and less than or equal to V.

In an embodiment of the disclosure, the numerical value H may be the sum of the first value and the second value divided by 2; that is, the numerical value H may be an average of the first value and the second value. The numerical value H may be the setting corresponding to the first internal signal IBO+ and the second internal signal IBO− reaching the second preset range. For example, H may be equal to (3+4)/2; that is, H may be equal to 3.5, and H may also be rounded up to 3 or down to 4. In other words, the duty cycle of the second internal signal IBO+ corresponding to the numerical value H may be within the second preset range, and the second preset range may be 48%-52%, such as 50%.

After the numerical value H being obtained, the differential amplification circuit may be no longer controlled by the counter, but the numerical value H may be used as the setting of the differential input circuit. Therefore, the differential amplification circuit may output the first internal signal IBO+ with a preset duty cycle, and the corresponding second internal signal IBO− may also be a signal whose duty cycle meets the requirements.

The first internal signal IBO+ and the second internal signal IBO− may be used as clock signals required for testing the memory. After the test being completed, the differential amplification circuit may be switched to receive an first external signal PAD+ and an second external signal PAD−, and generate the first internal signal IBO+ and the second internal signal IBO−. Correspondingly, the comparison circuit and the logical unit may also monitor the duty cycle of the first internal signal IBO+ and the duty cycle of the second internal signal IBO−, and control the differential amplification circuit according to the output result of the comparison circuit, so as to ensure the duty cycle stability of the first internal signal IBO+ and the second internal signal IBO−, and then improve the reading-writing performance of the memory.

According to the memory provided by the embodiments of the disclosure, through the oscillation circuit, the comparison circuit and the logical unit, a high-speed first oscillation signal OSC+ and a high-speed second oscillation signal OSC− with adjustable duty cycles may be generated in the memory. The first oscillation signal OSC+ and the second oscillation signal OSC− may be differential signals; the first oscillation signal OSC+ and the second oscillation signal OSC− will meet the requirements of a high-frequency operating signal of the memory. Therefore, the first oscillation signal OSC+ and the second oscillation signal OSC− may be used as test input signals for testing the memory. Thus, the memory may achieve a BIST function, and there will be no need to use additional test equipment to provide the test input signals. And meanwhile, the problem that the test equipment is difficult to provide a high-frequency test input signal can be solved.

Moreover, in the embodiments of the disclosure, the comparison circuit 102 may detect the output of the oscillation circuit 101. Furthermore, the logical unit 103 may control the oscillation circuit 101 according to the output result of the comparison circuit 102, so that the duty cycle of the first oscillation signal OSC+ and the duty cycle of the second oscillation signal OSC− may be stabilized within the preset range. Therefore, the adverse effect of duty cycle deviation on the test accuracy can be avoided, and the test accuracy of testing the memory by utilizing the first oscillation signal OSC+ and the second oscillation signal OSC− can be improved. For example, the duty cycle of the first oscillation signal OSC+ and the duty cycle of the second oscillation signal OSC− may be precisely controlled at 50%.

Moreover, the oscillation circuit 101 may also include a path analog circuit 121, the path analog circuit 121 may not only amplify and output the high-speed oscillation signals, but also simulate circuit characteristics from the controller to an output terminal of the differential amplification circuit, to enable the first oscillation signal OSC+ and the second oscillation signal OSC− to be more in line with the actual application scenario of the memory. And thus, the test accuracy of testing by utilizing the first oscillation signal OSC+ and the second oscillation signal OSC− can further be improved.

Through the differential amplification circuit 120, the comparison circuit 102 and the logical unit 103, the steady first internal signal IBO+ and the steady second internal signal IBO− may be generated in the memory, and the first internal signal IBO+ and the second internal signal IBO− will meet the requirements of a high-frequency operating signal of the memory. Therefore, the first internal signal IBO+ and the second internal signal IBO− may be used as the test input signals for testing the memory, so that the memory may achieve the BIST function, and there will be no need to use additional test equipment to provide the test input signals. And meanwhile, the problem that the test equipment is difficult to provide a high-frequency test input signal can be solved.

Meanwhile, the memory may also calibrate the differential amplification circuit 120, the duty cycle deviation caused by the differential amplification circuit 120 may be reduced, so that the reading and writing operation performance of the memory can be improved. For example, the noise allowance can be improved, and the signal integrity can further be improved. Correspondingly, when the first internal signal IBO+ and the second internal signal IBO− are generated based on the first external signal PAD+ and the second external signal PAD−, the first internal signal IBO+ and the second internal signal IBO− may be clock signals required for the normal reading-writing operation of the memory. Since the duty cycle stability of the first internal signal IBO+ and the second internal signal IBO− is good, the reading-writing performance of the memory may be improved.

Moreover, in the embodiments of the disclosure, the comparison circuit 102 may detect the output of the differential amplification circuit 120. Furthermore, the logical unit 103 may control the differential amplification circuit 120 according to the output result of the comparison circuit 102, so that the duty cycle of the first internal signal IBO+ and the duty cycle of the second internal signal IBO− may be stabilized within the second preset range. Therefore, the adverse effect of duty cycle deviation on the test accuracy can be avoided, and the test accuracy of testing the memory by utilizing the first internal signal IBO+ and the second internal signal IBO− can be improved. For example, the duty cycle of the first internal signal IBO+ and the duty cycle of the second internal signal IBO− may be precisely controlled at 50%.

Meanwhile, the memory provided by the embodiments of the disclosure also has the DCM function and the DCA function.

Figure 7:
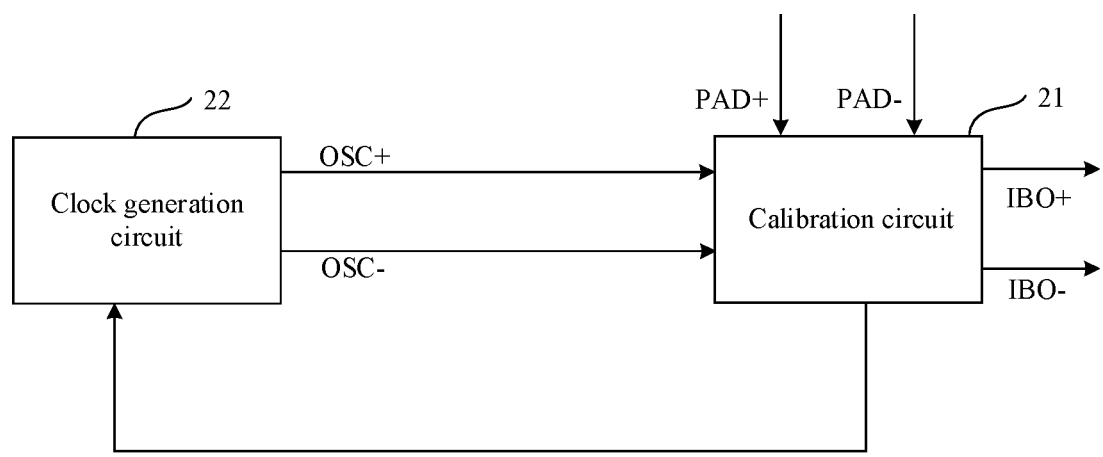
FIG. 7 is a functional block diagram of a memory according to another embodiment of the disclosure.
Figure 8:
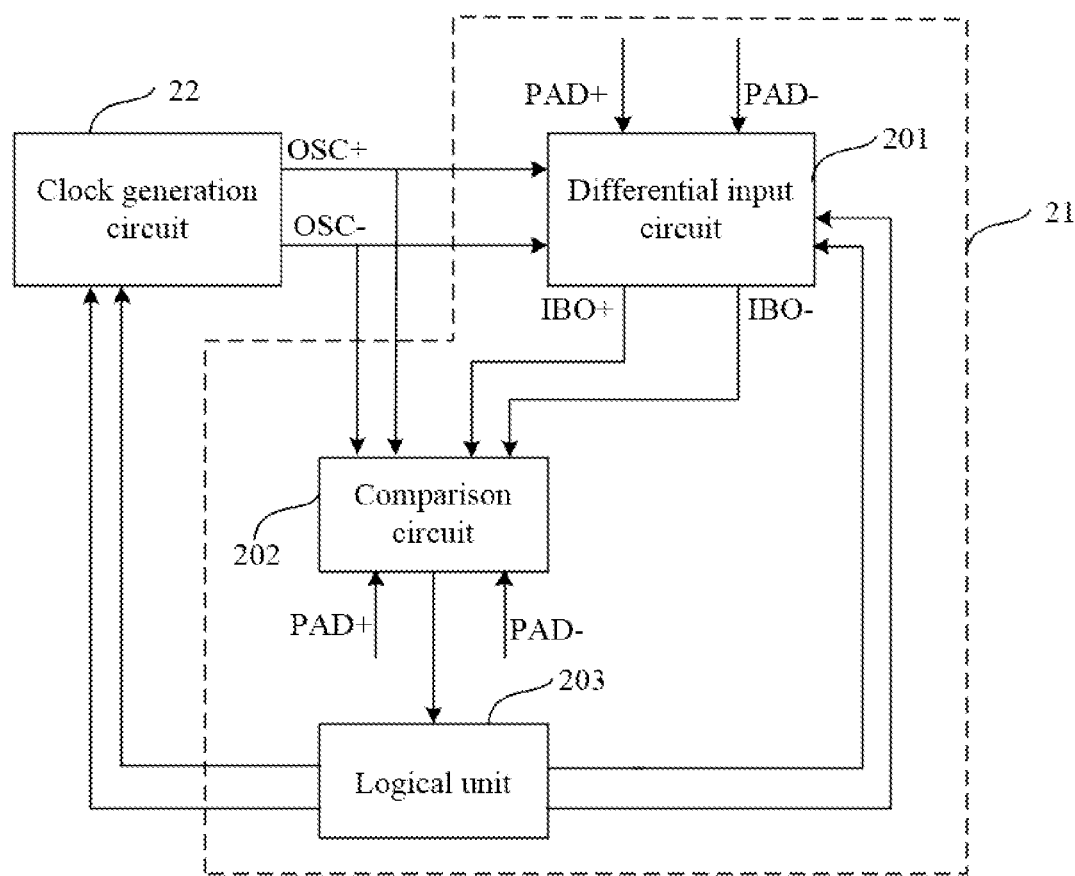
FIG. 8 is a functional block diagram of a memory according to another embodiment of the disclosure.
Figure 9:
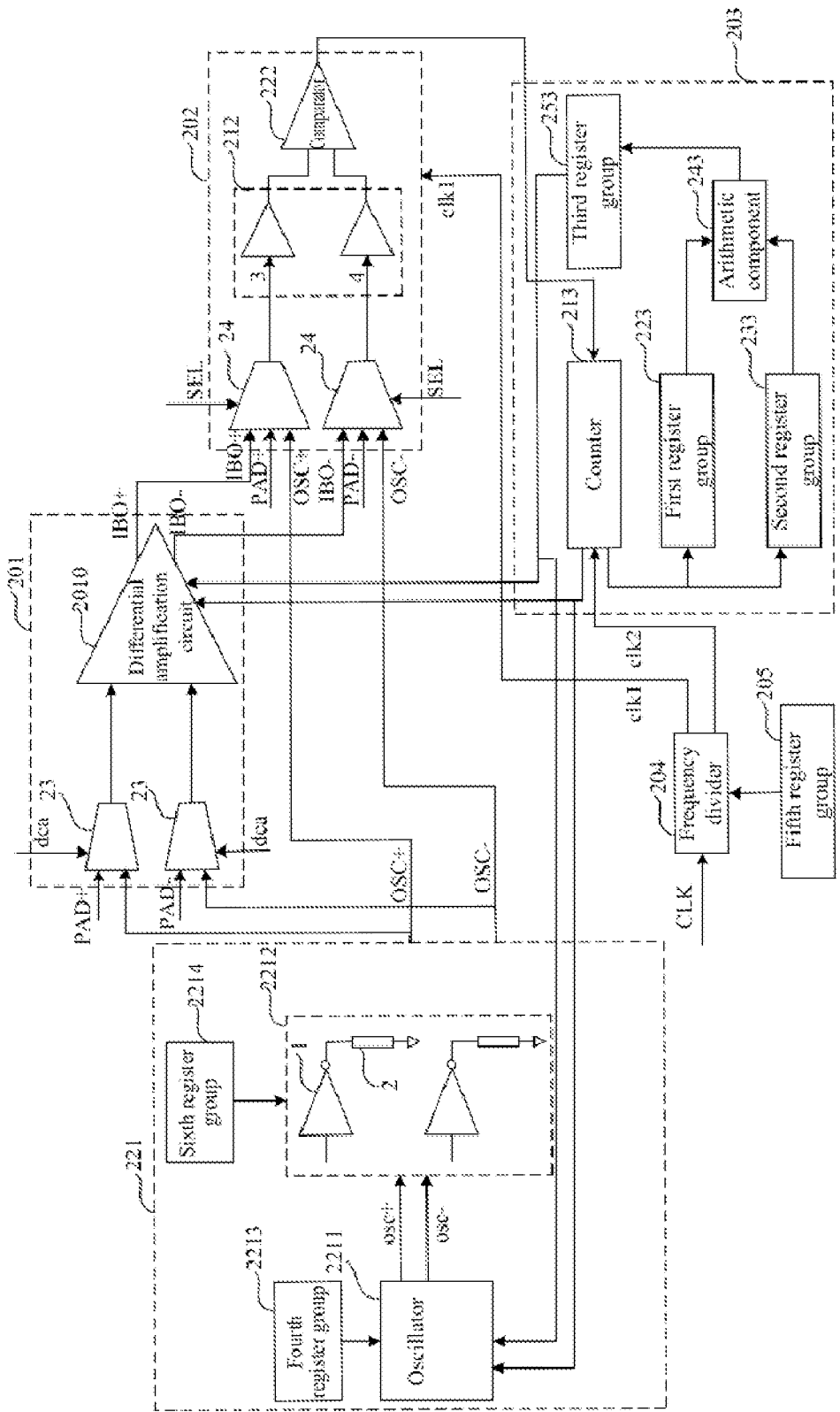
FIG. 9 is a schematic structural diagram of a memory according to another embodiment of the disclosure.

Another embodiment of the disclosure further provides a memory. FIG. 7 is a functional block diagram of a memory according to another embodiment of the disclosure. FIG. 8 is another functional block diagram of a memory according to another embodiment of the disclosure. FIG. 9 is a schematic structural diagram of a memory according to another embodiment of the disclosure. The memory provided by another embodiment of the disclosure will be described in detail in combination with the drawings.

Referring to FIGS. 7 to 9, in the embodiment of the disclosure, a memory may include: a calibration circuit 21, configured to receive a first external signal PAD+ and a second external signal PAD−, and generate a first internal signal IBO+ and a second internal signal IBO−. At least one of a duty cycle of the first internal signal IBO+ or a duty cycle of the second internal signal IBO− is within a third preset range. The memory may further include a clock generation circuit 22, configured to generate a first oscillation signal OSC+ and a second oscillation signal OSC−. The first oscillation signal OSC+ and the second oscillation signal OSC− have a same frequency but opposite phases. Herein, the calibration circuit 21 is further configured to adjust at least one of a duty cycle of the first oscillation signal OSC+ or a duty cycle of the second oscillation signal OSC−, and enable the at least one of the duty cycle of the first oscillation signal OSC+ or the duty cycle of the second oscillation signal OSC− to be within a fourth preset range.

The memory provided by the embodiment of the application will be described in detail in combination with the drawings.

The first external signal PAD+ and the second external signal PAD− may be clock signals required for the normal reading-writing operation of the memory, and the first external signal PAD+ and the second external signal PAD− may also be the differential signal.

In the embodiment of the disclosure, the calibration circuit 21 may include: a differential input circuit 201, configured to receive the first external signal PAD+ and the second external signal PAD−, and generate the first internal signal IBO+ and the second internal signal IBO−. The calibration circuit 21 may include a comparison circuit 202, connected with an output terminal of the differential input circuit 201, and configured to compare the at least one of the duty cycle of the first internal signal IBO+ or the duty cycle of the second internal signal IBO−. And the calibration circuit 21 may further include a logical unit 203, connected with the comparison circuit 202 and the differential input circuit 201, and configured to control the differential input circuit 201 according to an output result of the comparison circuit 202, so that the at least one of the duty cycle of the first internal signal IBO+ or the duty cycle of the second internal signal IBO− is within the third preset range.

Referring to FIG. 9, the differential input circuit 201 may include a differential amplification circuit 2010 and a second selector 23. The comparison circuit 202 may include a first selector 24, an integral unit 212 and a comparator 222.

Since the first internal signal IBO+ and the second internal signal IBO− are differential signals, a sum of the duty cycle of the first internal signal IBO+ and the duty cycle of the second internal signal IBO− may be 100%. And the comparison circuit 202 may be configured to detect the duty cycle of the differential first internal signal IBO+ and the duty cycle of the differential second internal signal IBO−. The operation that the comparison circuit 202 compares the at least one of the duty cycle of the first internal signal IBO+ or the duty cycle of the second internal signal IBO− may include at least one of the following three conditions.

The comparison circuit 202 may compare the duty cycle of the first internal signal IBO+. In some embodiments, the comparison circuit 202 may determine whether the duty cycle of the first internal signal IBO+ is within the third preset range. And for example, the third preset range may be 48%-52%. When the comparison circuit 202 determines that the duty cycle of the first internal signal IBO+ is within the third preset range, the duty cycle of the second internal signal IBO− may also be within the third preset range. And when the comparison circuit 202 determines that the duty cycle of the first internal signal IBO+ is not within the third preset range, the duty cycle of the second internal signal IBO− may also be not within the third preset range.

The comparison circuit 202 may compare the duty cycle of the second internal signal IBO−. In some embodiments, the comparison circuit 202 may determine whether the duty cycle of the second internal signal IBO− is within the third preset range, for example, the second preset range may be 48%-52%. When the comparison circuit 202 determines that the duty cycle of the second internal signal IBO− is within the third preset range, the duty cycle of the first internal signal IBO+ may also be within the third preset range; and when the comparison circuit 202 determines that the duty cycle of the second internal signal IBO− is not within the third preset range, the duty cycle of the first internal signal IBO+ may also not be within the third preset range.

The comparison circuit 202 may compare the duty cycle of the first internal signal IBO+ with the duty cycle of the second internal signal IBO−. In some embodiments, the comparison circuit 202 may determine whether a difference value between the duty cycle of the first internal signal IBO+ and the duty cycle of the second internal signal IBO− is within a preset difference value range, and the preset difference value range may be −4%-4%. When the comparison circuit 202 determines that the difference value is within the preset difference value range, the duty cycle of the first internal signal IBO+ and the duty cycle of the second internal signal IBO− may be both within the third preset range. Otherwise, the duty cycle of the first internal signal IBO+ and the duty cycle of the second internal signal IBO− may not reach the third preset range.

It should be noted that, both the numerical ranges of the aforementioned third preset range and the preset difference value range are exemplary descriptions. The embodiment of the disclosure may not limit the third preset range and the preset difference value range, and the third preset range and the preset difference value range may be reasonably set according to actual performance requirements of the memory.

The comparison circuit 202 may include: an integral unit 212, having a first input terminal 3 and a second input terminal 4. And the first input terminal 3 may receive one of the first internal signal IBO+ and the second internal signal IBO−, and the second input terminal 4 may receive another one of the second internal signal IBO− and the first internal signal IBO+. The comparison circuit may further include a comparator 222, connected to an output terminal of the integral unit 212.

The integral unit 212 may include two integral circuits. Furthermore, the first input terminal 3 may be used as an input terminal of one of the integral circuits, and the second input terminal 4 may be used as an input terminal of another one of the integral circuits. The comparator 222 may be configured to compare the outputs of the two integral circuits, and then output a high level or a low level.

The comparison circuit 202 may perform an integral operation on the input first internal signal IBO+ and the input second internal signal IBO− through the two integral circuits. Furthermore, a result of the integral operation may be input into the comparator 222, and the comparator 222 may output a comparison result.

For example, the first internal signal IBO+ may be taken as a positive terminal (duty+), and the second internal signal IBO− may be taken as a negative terminal (duty-). In one example, when the output of the comparator 222 is at the high level, the duty cycle of the first internal signal IBO+ may be greater than the duty cycle of the second internal signal IBO−. And when the output of the comparator 222 is at the low level, the duty cycle of the first internal signal IBO+ may be less than the duty cycle of the second internal signal IBO−.

It should be noted that, the aforementioned corresponding relationship among the output result of the comparison circuit 202, the duty cycle of the first internal signal IBO+ and the duty cycle of the second internal signal IBO− may merely be exemplary. The embodiments of the disclosure may not limit the corresponding relationship among the high level, the low level, the duty cycle of the first internal signal IBO+ and the duty cycle of the second internal signal IBO−, as long as it is ensured that different output results correspond to the different corresponding relationships between the duty cycle of the first oscillation signal OSC+ and the duty cycle of the second oscillation signal OSC−.

As shown in FIG. 9, the output result of the comparison circuit 202 may be sampled and output through a sampling clock clk1. In an embodiment of the disclosure, the comparison circuit 202 may be driven by the sampling clock clk1, and the frequency of the sampling clock clk1 may be lower than at least one of the frequency of the first internal signal IBO+ or the frequency of the second internal signal IBO−. The faster the frequency of the sampling clock clk1 is, the greater the sampling error will be. The slower the frequency of the sampling clock clk1 is, the smaller the sampling error will be, but the longer the test time will be. Therefore, the optimal frequency of the sampling clock clk1 may be comprehensively selected according to the sampling error and the test time.

In an embodiment of the disclosure, a clock generation circuit may further include a frequency divider 104, configured to receive an external clock signal CLK, and generate the sampling clock clk1. The external clock signal CLK may be provided by the test equipment or the memory.

Moreover, it can be seen from the foregoing analysis that, when the frequency of the sampling clock clk1 is adjustable, different frequencies of the sampling clock clk1 may be selected according to actual conditions. Therefore, in an embodiment of the disclosure, the clock generation circuit may further include a fifth register group 105, connected with the frequency divider 104, and the fifth register group may be configured to configure the frequency of the sampling clock. The fifth register group 105 may be an MR.

Since the inherent characteristics of the comparison circuit 202 may cause input deviation, in order to eliminate the error of the test result caused by the free input deviation of the comparison circuit 202. In an embodiment of the disclosure, the comparison circuit 202 may further be configured to allow the first input terminal 3 and the second input terminal 4 to be interchangeable. The comparison circuit 202 may be configured as the following.

In response to an inversion identification signal being at a low level, the comparison circuit 202 may be configured to receive, through the first input terminal of the integral unit 212, the first internal signal IBO+; and in response to the inversion identification signal being at a high level, the comparison circuit 202 may be configured to receive, through the first input terminal of the integral unit 212, the second internal signal IBO−. In response to the inversion identification signal being at the low level, the comparison circuit 202 may be configured to receive, through the second input terminal of the integral unit 212, the second internal signal IBO−; and in response to the inversion identification signal being at the high level, the comparison circuit 102 may be configured to receive, through the second input terminal of the integral unit 112, the first internal signal IBO+. Herein, the MR may be arranged in the memory, and the inversion identification signal may be provided by the MR, for example, in the LPDDR4, the LPDDR5 or the LPDDR6, the inversion identification signal may be defined as a DCM MR OP[1]. When the DCM MR OP[1] is 0, it may indicate that the inversion identification signal is at the low level, and when the DCM MR OP[1] is 1, it may indicate that the turnover identification signal is at the high level.

The logical unit 203 may control the differential amplification circuit 2010 according to a detection result of the comparison circuit 202, and adjust the circuit characteristics of the differential amplification circuit 2010, so that the duty cycle of the first internal signal IBO+ and the duty cycle of the second internal signal IBO− output by the adjusted the differential amplification circuit 2010 can be within the second preset range.

The logical unit 203 may include: a counter 213, configured to adjust the at least one of the duty cycle of the first internal signal IBO+ or the duty cycle of the second internal signal IBO−; a first register group 223, configured to store the first value of the counter 213 according to the output of the comparator 222 in response to the inversion identification signal being at the low level; and a second register group 233, configured to store the second value of the counter 213 according to the output of the comparator 222 in response to the inversion identification signal being at the high level.

The counter 213 may have functions for adjusting the circuit characteristics of the differential amplification circuit 2010 and changing the duty cycle of the first internal signal IBO+ and the duty cycle of the second internal signal IBO−. And the duty cycle of the first internal signal IBO+ and the duty cycle of the second internal signal IBO− may change monotonically. For example, the duty cycle may change from a minimum value to a maximum value, or from the maximum value to the minimum value in one counting cycle. In one counting cycle, the output result of the comparator 222 may have merely one inversion point, the value of the counter 213 corresponding to the inversion point may be set, to enable the duty cycle of the first internal signal IBO+ and the duty cycle of the second internal signal IBO− output by the differential amplification circuit 2010 to be the closest to the third preset range. The value used as the value of the counter 213 may be stored in the first register group 223 or the second register group 233.

When the inversion identification signal is at the low level, the first value of the counter 213 may be stored according to the output of the comparator 222, and the first value may be stored in the first register group 223. When the inversion identification signal is at the high level, the second value of the counter 213 may be stored according to the output of the comparator 222, and the second value may be stored in the second register group 233. In order to conveniently understand this, the operating principle of the logical unit 203 will be described in detail below.

When the inversion identification signal is at the low level, the first input terminal 3 of the integral unit 212 may be configured to receive the first internal signal IBO+, and the second input terminal 4 may be configured to receive the second internal signal IBO−. The counter 213 may start counting, for example, the counter 213 counts from 0 to 31 in one counting cycle. And meanwhile, the duty cycle of the first internal signal IBO+ and the duty cycle of the second internal signal IBO− output by the differential amplification circuit 2010 may also change from a minimum value to a maximum value (such as from 40% to 60%), or from a maximum value to a minimum value. Therefore, in one counting cycle (such as from 0 to 31), the comparator 222 may have merely one inversion point, the value of the counter 113 corresponding to the inversion point may be the first value, and the first value may be set, to enable the duty cycle of the first internal signal IBO+ output by the differential amplification circuit 2010 to be the closest to the second preset range. For example, the first value may be set, to enable the duty cycle to be the closest to 50%, and the first value to be stored in the first register group 223.

When the inversion identification signal is at the high level, the first input terminal 3 of the integral unit 212 may be configured to receive the second internal signal IBO−, the second input terminal 4 may be configured to receive the first internal signal IBO+. That is, the input terminals of the comparison circuit 202 may be interchangeable. The counter 213 may be configured to enter a new counting cycle, for example, the counter 213 may count from 0 to 31 again. And similarly, the second value of the counter 113 corresponding to the output inversion point of the comparator 222 may be stored in the second register group 233.

It should be noted that, the aforementioned counting cycle from 0 to 31 is merely exemplary description. The counting type of the counter 213 will not be limited in the embodiments of the disclosure. The counter 213 may be either an addition counter or a subtraction counter, which may implement a sequential increasing or decreasing counting, or a step-by-step increasing or decreasing counting, so that a monotonic change of the counter 213 in a single counting cycle can be ensured.

The first input terminal 3 and the second input terminal 4 of the comparison circuit 202 may be interchangeable. By controlling the differential amplification circuit 2010 through two counts, the adverse effect caused by the input deviation of the comparison circuit 202 may be eliminated, and the accuracy of the test result can further be improved.

Moreover, the logical unit 203 may further include: an arithmetic component 243, connected with the first register group 223 and the second register group 233, and the arithmetic component 143 may be configured to perform addition, subtraction, multiplication and division on an output of the first register group 223 and the second register group 233; and a third register group 253, connected with the arithmetic component 243, and configured to store an output result of the arithmetic component 243.

Referring to FIG. 9, the third register group 253 and the counter 213 of the logical unit 203 are respectively connected with the oscillation circuit 221 through signal lines. The third register group 253 and the counter 213 of the logical unit 203 are respectively connected with the differential amplification circuit 2010 through signal lines.

The output of the first register group 223 may refer to the first value stored in the first register group 223, and the output of the second register group 233 may refer to the second value stored in the second register group 233. In an embodiment of the disclosure, the arithmetic component 243 may add the first value and the second value, and then may divide them by 2, to obtain an average value. The average value may be used as the output result of the arithmetic component 243, and the average value may be stored in the third register group 253. Since the average value already eliminates the input deviation of the comparison circuit 202, the average value may be set, to enable the duty cycle of the first internal signal IBO+ and the duty cycle of the second internal signal IBO− output by the differential amplification circuit 2010 to be the closest to the third preset range. For example, the duty cycle of the first internal signal IBO+ and the duty cycle of the second internal signal IBO− may be the closest to 50%.

It should be understood that, the average value may be an integer rounded up by adding the first value, and then dividing the sum of the first value and the second value by 2, or an integer rounded down by adding the first value, and then dividing the sum of the first value and the second value by 2.

It should be noted that, in an embodiment of the disclosure, the average of the first value and the second value can be taken as an example, and in other embodiments, other calculation methods may also be used to calculate the first value and the second value.

The first register group 223, the second register group 233 and the third register group 253 all may be MRs.

In an embodiment of the disclosure, the counter 213 may be driven by a calculator clock, and the frequency of the calculator clock may be lower than the at least one of the frequency of the first internal signal IBO+ or the frequency of the second internal signal IBO−. The frequency of the calculator clock may be adjustable, and the frequency of the calculator clock may be reasonably selected according to the speed for adjusting the differential amplification circuit 2010.

Moreover, the frequency of the sampling clock may be the same as the frequency of the calculator clock. The frequency divider may further be configured to receive an external clock signal, and generate the sampling clock and the calculator clock. And similarly, the fifth register group may further be configured to configure the frequency of the calculator clock.

The value stored in the third register group 253 may correspond to the setting of the differential amplification circuit 2010. And at the time, the duty cycle of the differential amplification circuit 2010 may be selectively switched from the counter 213 to the third register group 253. Therefore, the differential amplification circuit may fixedly output the first internal signal IBO+ and the second internal signal IBO− at the optimal duty cycle (namely, the duty cycle within the third preset range). It should be understood that, during a period that the differential amplification circuit 2010 fixedly outputs the first internal signal IBO+ and the second internal signal IBO− at the optimal duty cycle, the comparison circuit 202 may continuously compare the at least one of the duty cycle of the first internal signal IBO+ or the duty cycle of the second internal signal IBO−. And when the duty cycle of the first internal signal IBO+ and the duty cycle of the second internal signal IBO− depart from the third preset range, the problem may be detected in time.

The comparison circuit 202 may also be connected with the output terminal of the clock generation circuit 22, and configured to receive the first oscillation signal OSC+ and the second oscillation signal OSC−, and may compare at least one of the duty cycle of the first oscillation signal OSC+ or the duty cycle of the second oscillation signal OSC−. And the logical unit 203 may also be connected with the clock generation circuit 22, and may be configured to control the clock generation circuit 22 according to the output result of the comparison circuit 202, so that the duty cycle of the first oscillation signal OSC+ and the duty cycle of the second oscillation signal OSC− may be within the fourth preset range.

Correspondingly, for the comparison circuit 202, its integral circuit 212 may further be configured as the following. In response to the inversion identification signal being at the low level, the integral circuit 212 may be configured to receive, through the first input terminal 3, one of the first oscillation signal OSC+ and the second oscillation signal OSC−, and the integral circuit 212 may further be configured to receive, through the second input terminal 4 another one of the second oscillation signal OSC− and the first oscillation signal OSC+. In response to the inversion identification signal being at the low level, the integral circuit 212 may be configured to receive, through the first input terminal 3, the first oscillation signal OSC+; and in response to the inversion identification signal being at the high level, the integral circuit 212 may be configured to receive, through the first input terminal 3, the second oscillation signal OSC−. In response to the inversion identification signal being at the low level, the integral circuit 212 may be configured to receive, through the second input terminal 4, the second oscillation signal OSC−; and in response to the inversion identification signal being at the high level, the integral circuit 212 may be configured to receive, through the second input terminal 4, the first oscillation signal OSC+.

Correspondingly, the counter may further be configured to adjust the at least one of the duty cycle of the first oscillation signal OSC+ or the duty cycle of the second oscillation signal OSC−. The frequency of the sampling clock may be the at least one of lower than the frequency of the first oscillation signal OSC+ or the frequency of the second oscillation signal OSC−. In addition, the frequency of the calculator clock may be lower than the at least one of the frequency of the first oscillation signal OSC+ or the frequency of the second oscillation signal OSC−.

In an embodiment of the disclosure, the clock generation circuit 22 may further include: an oscillation circuit 221, configured to generate the first oscillation signal OSC+ and the second oscillation signal OSC−. And the output terminal of the oscillation circuit 221 may be configured to be connected with the comparison circuit 202. The calibration circuit 21 may further be configured to control the oscillation circuit 221, so that the at least one of the duty cycle of the first oscillation signal OSC+ or the duty cycle of the second oscillation signal OSC− may be within the fourth preset range.

The oscillation circuit 221 may include: an oscillator 2211, configured to generate a first initial oscillation signal and a second initial oscillation signal, where the first initial oscillation signal and the second initial oscillation signal have a same frequency but opposite phases. And the oscillation circuit 221 may further include a path analog circuit 2212, arranged between the oscillator 2211 and the comparison circuit 202. One terminal may be connected with an output terminal of the oscillator 2211, and another terminal may be connected with an input terminal of the comparison circuit 202. And the path analog circuit may be configured to simulate circuit characteristics of a first path, receive the first initial oscillation signal to generate a first oscillation signal OSC+, and receive the second initial oscillation signal to generate a second oscillation signal OSC−. In some embodiments, the memory may further include a fourth register group 2213, connected with the oscillator 2211, and the fourth register group may be configured to configure the frequency of the first oscillation signal OSC+ and the frequency of the second oscillation signal OSC−. And the memory may further include a sixth register group 2214, connected with the path analog circuit 2212, and the sixth register group may be configured to configure electrical parameters of the path analog circuit 2212.

The specific structure of the oscillation circuit 221 may be described with reference to the above embodiments, which will not be elaborated herein.

The specific mechanism that the calibration circuit 201 makes the duty cycle of the first oscillation signal OSC+ and the duty cycle of the second oscillation signal OSC− within the fourth preset range may refer to the specific mechanism that the calibration circuit 201 makes the duty cycle of the first internal signal IBO+ and the duty cycle of the second internal signal IBO− within the third preset range, which will not be elaborated herein.

Correspondingly, the comparison circuit 202 may also include a first selector 24. The first oscillation signal OSC+, the second oscillation signal OSC−, the first internal signal IBO+, the second internal signal IBO−, the first external signal PAD+ and the second external signal PAD− may be connected with the first selector. The first oscillation signal OSC+ and the second oscillation signal OSC− may be taken as a first differential signal pair, the first external signal PAD+ and the second external signal PAD− may be taken as a second differential signal pair, and the first internal signal IBO+ and the second internal signal IBO− may be taken as a third differential signal pair. The first selector 24 may be configured to select one of the first differential signal pair, the second differential signal pair and the third differential signal pair to be input into the comparator 222 through the integral unit 212.

The control terminal of the first selector 24 may be configured to receive an SEL, and select one of the first differential signal pair, the second differential signal pair and the third differential signal pair based on the SEL to be input into the comparator 222 through the integral unit 212. When it is necessary to monitor the duty cycle of the first oscillation signal OSC+ and the duty cycle of the second oscillation signal OSC−, the first oscillation signal OSC+ and the second oscillation signal OSC− may be selected and input into the comparator 222 through the integral unit 212. When it is necessary to monitor the duty cycle of the first external signal PAD+ and the duty cycle of the second external signal PAD−, the first external signal PAD+ and the second external signal PAD− may be selected and input into the comparator 222 through the integral unit 212. And when it is necessary to monitor the duty cycle of the first internal signal IBO+ and the duty cycle of the second internal signal IBO−, the first internal signal IBO+ and the second internal signal IBO− may be selected and input into the comparator 222 through the integral unit 212.

In an embodiment of the disclosure, the differential amplification circuit 2010 may further be configured to receive the first oscillation signal OSC+ and the second oscillation signal OSC−, and generate the first internal signal IBO+ and the second internal signal IBO−. And furthermore, the differential amplification circuit 2010 may be controlled according to the comparison results of the duty cycle of the first internal signal IBO+ and the duty cycle of the second internal signal IBO−. Since the differential amplification circuit 2010 has inherent circuit characteristics, even if the duty cycle of the first oscillation signal OSC+ and the duty cycle of the second oscillation signal OSC− are in line with requirements (namely, the duty cycle of the first oscillation signal OSC+ and the duty cycle of the second oscillation signal OSC− are within the fourth preset range), the duty cycle of the first internal signal IBO+ and the duty cycle of the second internal signal IBO− obtained after outputting through the differential amplification circuit 2010 may possibly deviate.

Therefore, the differential amplification circuit 2010 may be controlled to receive the first oscillation signal OSC+ and the second oscillation signal OSC− (i.e., the duty cycle of the first oscillation signal OSC+ and the duty cycle of the second oscillation signal OSC− within the fourth preset range), and output the first internal signal IBO+ and the second internal signal IBO−. The comparison circuit 202 may be configured to detect the duty cycle of the first internal signal IBO+ and the duty cycle of the second internal signal IBO−. Furthermore, the differential amplification circuit 2010 may be controlled through the logical unit 203, and thus, the influence of the inherent circuit characteristics of the differential amplification circuit 2010 on the clock signal may be reduced, even eliminated.

Correspondingly, the differential input circuit 201 may further include a second selector 23. The first oscillation signal OSC+, the second oscillation signal OSC−, the first external signal PAD+ and the second external signal PAD− may be connected with the second selector 23. And the first oscillation signal OSC+ and the second oscillation signal OSC− may be taken as a first differential signal pair, and the first external signal PAD+ and the second external signal PAD− may be taken as a second differential signal pair. The second selector 23 may be configured to select one of the first differential signal pair and the second differential signal pair to be input into the differential amplification circuit 2010.

The control terminal of the second selector 23 may be configured to receive a calibration enable signal dca. In response to the calibration enable signal dca being at a low level, the first external signal PAD+ and the second external signal PAD− may be input into the differential amplification circuit 2010. In response to the calibration enable signal being at a high level, the first oscillation signal OSC+ and the second oscillation signal OSC− may be input into the differential amplification circuit 2010.

In response to the calibration enable signal dca being at the high level, the memory may be configured to enter a duty cycle calibration state. And the duty cycles of the first oscillation signal OSC+ and the second oscillation signal OSC− within the fourth preset range may be input into the differential amplification circuit 2010, so as to execute a duty cycle calibration or a duty cycle adjustment, thereby realizing the DCA function. In response to the calibration enable signal dca being at the low level, the memory may quit the duty cycle calibration state. And the first external signal PAD+ and the second external signal PAD− may be input into the differential amplification circuit 2010, so as to execute the duty cycle detection or the duty cycle monitoring, thereby realizing the DCM function. Moreover, in response to the calibration enable signal dca being at the low level, the memory may also be in the duty cycle calibration state. The first external signal PAD+ and the second external signal PAD− may be input into the differential input circuit 201, to execute the duty cycle detection or the duty cycle monitoring. After that, the differential amplification circuit 2010 may be adjusted to execute the duty cycle calibration or the duty cycle adjustment to realize the DCA function.

Additionally, before the first oscillation signal OSC+ and the second oscillation signal OSC− whose duty cycles are within the fourth preset range, are input to the differential amplification circuit 2010, it may also be necessary to obtain the first oscillation signal OSC+ and the second oscillation signal OSC− whose duty cycles are within the fourth preset range. The clock generation circuit 22 may be controlled by utilizing the comparison circuit 202 and the logical unit 203, so that the duty cycle of the first oscillation signal OSC+ and the duty cycle of the second oscillation signal OSC− output by the oscillation circuit 221 may be within the fourth preset range.

It is not difficult to find that the actual structure of the memory according to the embodiments of the disclosure may be the same as the structure of the memory according to the aforementioned embodiments. The main differences may be that: in the aforementioned embodiments, the DCM function and the DCA function are divided in the clock generation circuit, that is, the comparison circuit and the logical unit for DCM and DCA are arranged in the clock generation circuit; while in the embodiments of the disclosure, the DCM function and the DCA function are divided in the calibration circuit, that is, the comparison circuit and logical unit for DCM and DCA are arranged in the calibration circuit. Therefore, the mechanism of DCM and DCA in the embodiments of the disclosure is basically consistent with that of the aforementioned embodiments.

A detailed description of the operating mechanism of the memory may refer to the specific descriptions of the aforementioned embodiment.

According to the memory according to the embodiments of the disclosure, the calibration circuit 21 may be configured to receive the first external signal PAD+ and the second external signal PAD−, and generate the first internal signal IBO+ and the second internal signal IBO− with a steady duty cycle. The first internal signal IBO+ and the second internal signal IBO− may be used as clock signals required for the normal reading-writing operation of the memory, and the reading-writing operation performance of the memory can be improved. Moreover, the clock generation circuit 22 may generate a differential first oscillation signal OSC+ and a differential second oscillation signal OSC−, and the first oscillation signal OSC+ and the second oscillation signal OSC− may be used as the test clock signals for testing the memory, so that there will be no need to use external test equipment to provide the test clock signals. Meanwhile, the calibration circuit 21 may further be adjust at least one of the duty cycle of the first oscillation signal OSC+ or the duty cycle of the second oscillation signal OSC−, so that the at least one of the duty cycle of the first oscillation signal OSC+ or the duty cycle of the second oscillation signal OSC− may be within the fourth preset range, and the accuracy of a test result of the memory can be easily improved.

According to the memory according to the embodiments of the disclosure, for correction of the calibration circuit, through the differential amplification circuit 2010, the comparison circuit 202 and the logical unit 203, a steady first internal signal IBO+ and a steady second internal signal IBO− may be generated in the memory. The first internal signal IBO+ and the second internal signal IBO− will meet the requirements of a high-frequency operating signal of the memory. Therefore, the first internal signal IBO+ and the second internal signal IBO− may be used as test input signals for testing the memory, Thus, the memory may achieve a BIST function, and there will be no need to use additional test equipment to provide the test input signals. And meanwhile, the problem that the test equipment is difficult to provide a high-frequency test input signal can be solved.

Meanwhile, the calibration circuit may further be configured to calibrate the differential amplification circuit 2010; the duty cycle deviation caused by the differential amplification circuit 2010 may be reduced, so that the reading and writing operation performance of the memory can be improved. For example, the noise allowance can be improved, and the signal integrity can be improved.

Moreover, in the embodiments of the disclosure, the comparison circuit 202 may be configured to detect the output of the differential amplification circuit 2010. Furthermore, the logical unit 203 may be configured to control the differential amplification circuit 2010 according to the output result of the comparison circuit 202, so that the duty cycle of the first internal signal IBO+ and the duty cycle of the second internal signal IBO− may be stabilized within the second preset range. Therefore, the adverse effect of duty cycle deviation on the test accuracy can be avoided, and the test accuracy of testing the memory by utilizing the first internal signal IBO+ and the second internal signal IBO− can be improved. For example, the duty cycle of the first internal signal IBO+ and the duty cycle of the second internal signal IBO− may be precisely controlled at 50%.

Meanwhile, the memory according to the embodiments of the disclosure may further have the DCM function and the DCA function.

Figure 10:
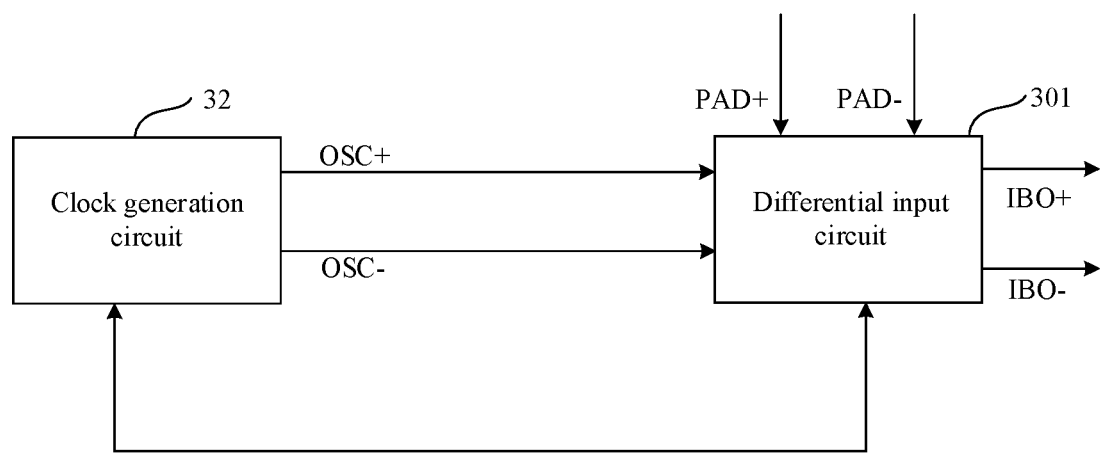
FIG. 10 is a functional block diagram of a memory according to another embodiment of the disclosure.
Figure 11:
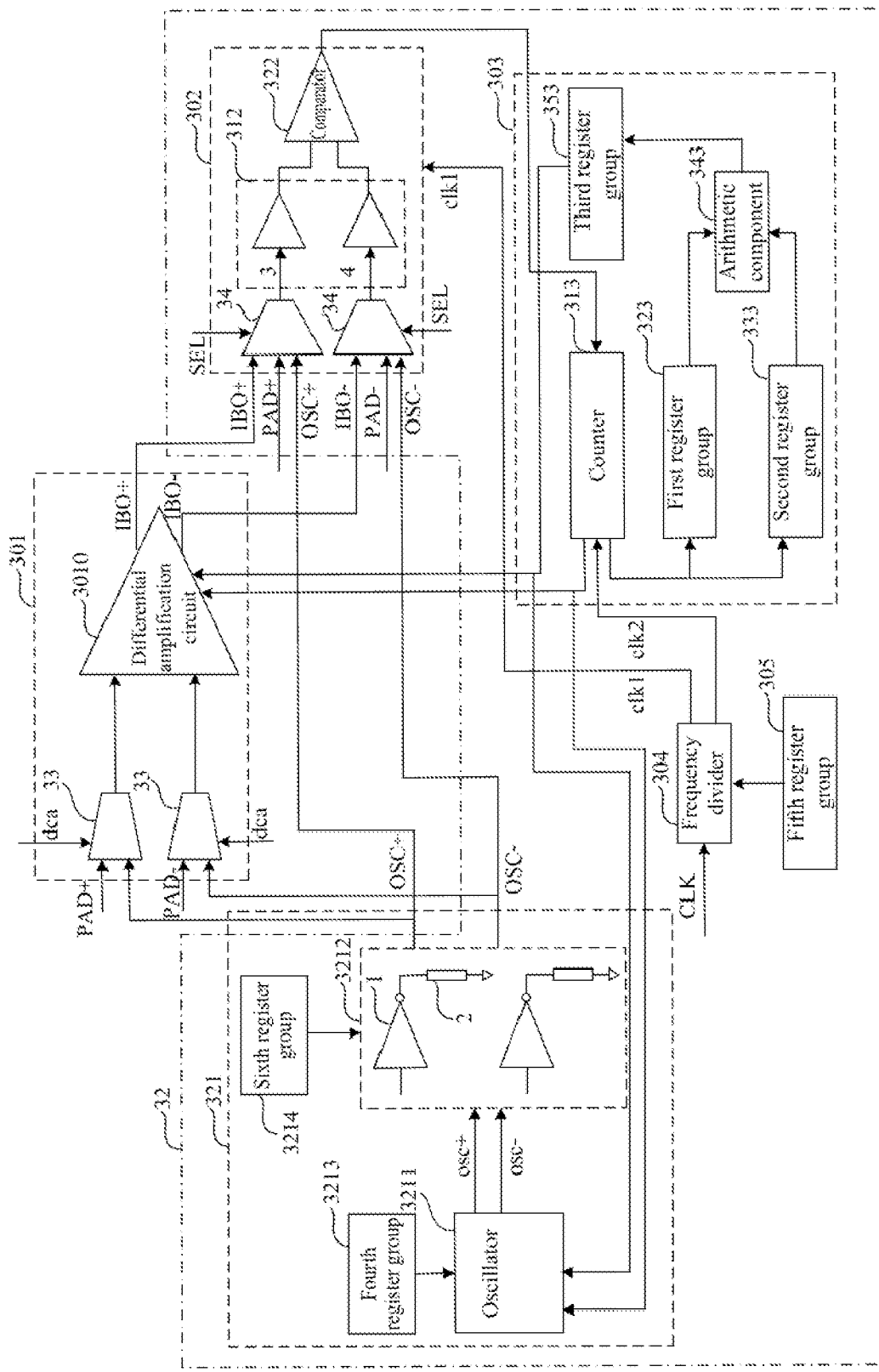
FIG. 11 is a schematic structural diagram of a memory according to another embodiment of the disclosure.

A memory may further be provided in another embodiment of the disclosure. FIG. 10 is a functional block diagram of a memory according to another embodiment of the disclosure. FIG. 11 is a schematic structural diagram of a memory according to another embodiment of the disclosure.

Referring to FIG. 10 and FIG. 11, in the embodiments of the disclosure, the memory may include: a clock generation circuit 32, configured to generate a first oscillation signal OSC+ and a second oscillation signal OSC−, where the first oscillation signal OSC+ and the second oscillation signal OSC− have a same frequency but opposite phases, and a duty cycle of the first oscillation signal OSC+ and a duty cycle of the second oscillation signal OSC− are both within a fifth preset range. The memory may include a first external signal PAD+ and a second external signal PAD− coming from an outside of the memory, where a duty cycle of the first external signal PAD+ and a duty cycle of the second external signal PAD− are both within a sixth preset range. And the memory may further include a differential input circuit 301, which is configured to receive the first oscillation signal OSC+ and the second oscillation signal OSC−, and output a first internal signal IBO+ and a second internal signal IBO− in a test mode; and the differential input circuit 301 is further configured to receive the first external signal PAD+ and the second external signal PAD−, and output the first internal signal IBO+ and the second internal signal IBO− in a normal operating mode. Herein, the differential input circuit 301 has data interaction with the clock generation circuit 32, so that at least one of the duty cycle of the first internal signal IBO+ or the duty cycle of the second internal signal IBO− is within a seventh preset range in the test mode or in the normal operating mode.

Referring to FIG. 11, the differential input circuit 301 may include a differential amplification circuit 3010 and a second selector 33.

The memory according to the embodiments of the disclosure will be described in detail in combination with the drawings.

In the embodiments of the disclosure, the clock generation circuit 32 may include: an oscillation circuit 321, configured to generate a first oscillation signal OSC+ and a second oscillation signal OSC−; a comparison circuit 302, configured to receive the first oscillation signal OSC+ and the second oscillation signal OSC−, and compare the at least one of the duty cycle of the first oscillation signal OSC+ or the duty cycle of the second oscillation signal OSC−. And the clock generation circuit 32 may further include a logical unit 303, connected to the comparison circuit 302 and the oscillation circuit 321, and configured to control the oscillation circuit 321 according to an output result of the comparison circuit 302, so that the at least one of the duty cycle of the first oscillation signal OSC+ or the duty cycle of the second oscillation signal OSC− may be within the fifth preset range.

Referring to FIG. 11, the comparison circuit 302 may include a first selector 34, an integral unit 312 and a comparator 322.

The oscillation circuit 321 may include an oscillator 3211, a path analog circuit 3212, a fourth register group 3213 and a sixth register group 3214. The specific structure of the oscillation circuit 321 may be described with reference to the above embodiments, which will not be elaborated herein.

Correspondingly, the data interaction may include: in the test mode or in the normal operating mode, the comparison circuit 302 may be configured to receive the first internal signal IBO+ and the second internal signal IBO−, and compare the at least one of the duty cycle of the first internal signal IBO+ or the duty cycle of the second internal signal IBO−. And the logical unit 303 may be connected with the differential amplification circuit 3010, and may be configured to control the differential amplification circuit 3010 according to an output result of the comparison circuit 302, so that the at least one of the duty cycle of the first internal signal IBO+ or the duty cycle of the second internal signal IBO− may be within the seventh preset range.

The test mode may refer to an operating mode when the memory is tested, which aims to test the performance of the memory. The normal operating mode may refer to a operating mode when the memory performs normal reading and writing operations.

Correspondingly, the comparison circuit 302 may include: an integral unit 312, having a first input terminal 3 and a second input terminal 4; and a comparator 322, connected with an output terminal of the integral unit 312.

In the test mode, the first input terminal 3 may be configured to receive one of the first oscillation signal OSC+ and the second oscillation signal OSC−, and the second input terminal 4 may be configured to receive another one of the second oscillation signal OSC− and the first oscillation signal OSC+. Alternatively, the first input terminal 3 may be configured to receive one of the first internal signal IBO+ and the second internal signal IBO−, and the second input terminal 4 may be configured to receive another one of the second internal signal IBO− and the first internal signal IBO+. In the normal operating mode, the first input terminal 3 may be configured to receive one of the first internal signal IBO+ and the second internal signal IBO−, the second input terminal 4 may be configured to receive another one of the second internal signal IBO− and the first internal signal IBO+. Alternatively, the first input terminal 3 may be configured to receive one of the first external signal PAD+ and the second external signal PAD−, and the second input terminal 4 may be configured to receive another one of the first external signal PAD+ and the second external signal PAD−.

Correspondingly, the comparison circuit 302 may further include a first selector 34, where the first oscillation signal OSC+, the second oscillation signal OSC−, the first internal signal IBO+, the second internal signal IBO−, the first external signal PAD+ and the second external signal PAD− may be connected with the first selector. And the first oscillation signal OSC+ and the second oscillation signal OSC− may be taken as a first differential signal pair, the first external signal PAD+ and the second external signal PAD− may be taken as a second differential signal pair and the first internal signal IBO+ and the second internal signal IBO− may be taken as a third differential signal pair. The first selector 34 may be configured to select one of the first differential signal pair, the second differential signal pair and the third differential signal pair to be input into the comparator 322 through the integral unit 312.

In the test mode, the first selector 34 may be configured to selects the first differential signal pair or the third differential signal pair to be input into the comparator 322 through the integral unit 312, so that the duty cycle of the first oscillation signal OSC+ and the duty cycle of the second oscillation signal OSC− may be compared; or, the duty cycle of the first internal signal IBO+ and the duty cycle of the second internal signal IBO− may be compared. It should be noted that, the first internal signal IBO+ and the second internal signal IBO− referred to herein may be output by a differential amplification circuit 301 after receiving the first oscillation signal OSC+ and the second oscillation signal OSC−.

In the normal operating mode, the first selector 34 may be configured to select the second differential signal pair or the third differential signal pair to be input into the comparator 322 through the integral unit 312, so that the duty cycle of the first external signal PAD+ and the duty cycle of the second external signal PAD− may be compared; or, the duty cycle of the first internal signal IBO+ and the duty cycle of the second internal signal IBO− may be compared. It should be noted that, the first internal signal IBO+ and the second internal signal IBO− referred to herein may be output by the differential amplification circuit 301 after receiving the first external signal PAD+ and the second external signal PAD−.

Correspondingly, the differential input circuit 301 may further include: a second selector 33, where the first oscillation signal OSC+, the second oscillation signal OSC−, the first external signal PAD+ and the second external signal PAD− may be connected with the second selector. And the first oscillation signal OSC+ and the second oscillation signal OSC− may be taken as a first differential signal pair and taking the first external signal PAD+, and the second external signal PAD− may be taken as a second differential signal pair. The second selector 33 may be configured to input one of the first differential signal pair and the second differential signal pair into the differential amplification circuit 3010.

In the test mode, the second selector 33 may be configured to select the first differential signal pair to be input into the differential amplification circuit 3010, so that the first oscillation signal OSC+ and the second oscillation signal OSC− may be used as test signals of testing the memory. In the normal operating mode, the second selector 33 may be configured to select the second differential signal pair to be input into the differential amplification circuit 3010, so that the first external signal PAD+ and the second external signal PAD− may be used as clock signals required for the normal reading and writing operations of the memory.

Moreover, in the test mode or in the normal operating mode, in response to the inversion identification signal being at the low level, the integral unit may be configured to receive, through the first input terminal 3 of the integral unit 312, the first internal signal IBO+; and in response to the inversion identification signal being at the high level, the integral unit may be configured to receive, through the first input terminal 3 of the integral unit 312, the second internal signal IBO−. In response to the inversion identification signal being at the low level, the integral unit may be configured to receive, through the second input terminal 4 of the integral unit 312, the second internal signal IBO−; and in response to the inversion identification signal being at the high level, the integral unit may be configured to receive, through the second input terminal 4 of the integral unit 312, the first internal signal IBO+.

In the test mode, in response to the inversion identification signal being at the low level, the integral unit may be configured to receive, through the first input terminal 3 of the integral unit 312, the first oscillation signal OSC+; and in response to the inversion identification signal being at the high level, the integral unit may be configured to receive, through the first input terminal 3 of the integral unit 312, the second oscillation signal OSC−. In response to the inversion identification signal being at the low level, the integral unit may be configured to receive, through the second input terminal 4 of the integral unit 312, the second oscillation signal OSC−; and in response to the inversion identification signal being at the high level, the integral unit may be configured to receive, through the second input terminal 4 of the integral unit 312, the first oscillation signal OSC+.

The benefit of exchanging the first input terminal 3 and the second input terminal 4 of the integration unit 312 may refer to the description of the foregoing embodiments, which will not be elaborated herein.

In the embodiments of the disclosure, the logical unit 303 may include: a counter 313, configured to adjust the at least one of the duty cycle of the first internal signal IBO+ or the duty cycle of the second internal signal IBO−; a first register group 323, configured to store the first value of the counter 313 according to an output of the comparator 322 in response to the inversion identification signal being at the low level; and a second register group 333, configured to store a second value of the counter 313 according to an output of the comparator 322 in response to the inversion identification signal being at the high level.

The logical unit 303 may further include: an arithmetic component 343, connected with the first register group 323 and the second register group 333, and configured to perform operations of addition, subtraction, multiplication and division on an output of the first register group 323 and an output of the second register group 333: and a third register group 353, connected with the arithmetic component 343, and configured to store an output result of the arithmetic component 343.

Referring to FIG. 11, the third register group 353 and the counter 313 of the logical unit 303 are respectively connected with the oscillation circuit 321 through signal lines. The third register group 353 and the counter 313 of the logical unit 303 are respectively connected with the differential amplification circuit 3010 through signal lines.

The specific description of the counter 313, the first register group 323, the second register group 333, the arithmetic component 343 and the third register group 353 may refer to the corresponding description of the above embodiments, which will not be elaborated below.

The memory according to the embodiments of the disclosure may realize the following functions.

In the test mode, the comparison circuit 302 may be configured to compare the duty cycle of the first oscillation signal OSC+ and the duty cycle of the second oscillation signal OSC− at first, and then the logical unit 303 may be configured to control the oscillation circuit 321 according to a comparison result output by the comparison circuit 302, so that the duty cycle of the first oscillation signal OSC+ and the duty cycle of the second oscillation signal OSC− may be within the fifth preset range. On this basis, in the test mode, the first oscillation signal OSC+ and the second oscillation signal OSC− with a steady duty cycle may be input into the differential amplification circuit 3010, the first internal signal IBO+ and the second internal signal IBO− may be output through the differential amplification circuit 3010. The comparison circuit 302 may be configured to compare the duty cycle of the first internal signal IBO+ and the duty cycle of the second internal signal IBO− at first, and then the logical unit 303 may be configured to control the oscillation circuit 321 according to the comparison result output by the comparison circuit 302, so that the duty cycle of the first internal signal IBO+ and the duty cycle of the second internal signal IBO− may be input into the seventh preset range.

In the normal operating mode, the first external signal PAD+ and the second external signal PAD− whose the duty cycles are within the sixth preset range, may be input into the differential amplification circuit 3010. The first internal signal IBO+ and the second internal signal IBO− may be output through the differential amplification circuit 3010. The comparison circuit 302 may be configured to compare the duty cycle of the first internal signal IBO+ and the duty cycle of the second internal signal IBO− at first, and then the logical unit 303 may be configured to control the differential amplification circuit 3010 according to the comparison result output by the comparison circuit 302, so that the duty cycle of the first internal signal IBO+ and the duty cycle of the second internal signal IBO− may be within the seventh preset range.

That is, the memory according to the embodiments of the disclosure may not only have a BIST system, but also realize the DCM function and the DCA function.

It is not difficult to find that the actual structure of the memory according to the embodiments of the disclosure may be the same as the structure of the memory according to the aforementioned embodiments. The main differences may be that: in the aforementioned embodiments, the DCM function and DCA function are divided in the clock generation circuit, that is, the comparison circuit and the logical unit for DCM and DCA are arranged in the clock generation circuit; while in the embodiments of the disclosure, the DCM function and DCA function are divided in the calibration circuit, that is, the comparison circuit and logical unit for DCM and DCA are arranged in the calibration circuit. Therefore, the mechanism of DCM and DCA in the embodiments of the disclosure is basically consistent with that of the aforementioned embodiments. A detailed description of the operating mechanism of the memory may refer to the specific descriptions of the aforementioned embodiment.

It can be understood by those of ordinary skill in the art that, the above various implementations are some embodiments for realizing the present application. In actual applications, various changes on the embodiments can be made in form and detail without departing from the spirit and the scope of the application. Those skilled in the art may implement respective variations and modifications without departing from the spirit and scope of the application, and thus the scope of protection of the application should be subject to the scope defined by the claims.

Embodiments of the disclosure provide a memory, which includes: a clock generation circuit, configured to generate a first oscillation signal and a second oscillation signal. The first oscillation signal and the second oscillation signal have a same frequency but opposite phases, and a duty cycle of the first oscillation signal and a duty cycle of the second oscillation signal are both within a first preset range. And the memory further includes a differential input circuit, which is configured to receive a first external signal and a second external signal, and generate a first internal signal and a second internal signal. Herein, the clock generation circuit is further configured to monitor at least one of the duty cycle of the first internal signal or the duty cycle of the second internal signal, and enable the at least one of the duty cycle of the first internal signal or the duty cycle of the second internal signal to be within a second preset range. According to the embodiments of the disclosure, the memory has a Duty Cycle Monitor (DCM) function and a Duty Cycle Adjust (DCA) function, and also can achieve detection and calibration on the differential input circuit.

What is claimed is:

1. A memory, comprising:
   a clock generation circuit, configured to generate a first oscillation signal and a second oscillation signal, wherein the first oscillation signal and the second oscillation signal have a same frequency but opposite phases, and a duty cycle of the first oscillation signal and a duty cycle of the second oscillation signal are both within a first preset range; and
   a differential input circuit, configured to receive a first external signal and a second external signal, and generate a first internal signal and a second internal signal; wherein the differential input circuit is further configured to receive the first oscillation signal and a second oscillation signal;
   wherein the clock generation circuit is further configured to monitor at least one of a duty cycle of the first internal signal or a duty cycle of the second internal signal, and enable the at least one of the duty cycle of the first internal signal or the duty cycle of the second internal signal to be within a second preset range;
   wherein the clock generation circuit comprises:
   an oscillation circuit, configured to generate the first oscillation signal and the second oscillation signal;
   a comparison circuit, configured to receive the first oscillation signal and the second oscillation signal, and compare the at least one of the duty cycle of the first oscillation signal or the duty cycle of the second oscillation signal; and
   a logical unit, connected with the comparison circuit and the oscillation circuit, the logical unit being configured to control the oscillation circuit according to an output result of the comparison circuit, so that the duty cycle of the first oscillation signal and the duty cycle of the second oscillation signal are within the first preset range;
   wherein the comparison circuit is further connected with an output terminal of the differential input circuit, and the comparison circuit is configured to receive the first internal signal and the second internal signal, and compare the at least one of the duty cycle of the first internal signal or the duty cycle of the second internal signal; and
   wherein the logical unit is further connected with the differential input circuit, and configured to control the differential input circuit according to the output result of the comparison circuit, so that the at least one of the duty cycle of the first internal signal or the duty cycle of the second internal signal is within the second preset range.

2. The memory of claim 1, wherein the comparison circuit comprises:
   an integral unit, having a first input terminal and a second input terminal, wherein the first input terminal is configured to receive one of the first internal signal and the second internal signal, and the second input terminal is configured to receive another one of the second internal signal and the first internal signal; or, the first input terminal is configured to receive one of the first oscillation signal and the second oscillation signal, and the second input terminal is configured to receive another one of the second oscillation signal and the first oscillation signal; and
   a comparator, connected with an output terminal of the integral unit.

3. The memory of claim 1, wherein the integral unit is configured to:
   when the first input terminal of the integral unit receives one of the first internal signal and the second internal signal, and the second input terminal of the integral unit receives another one of the second internal signal and the first internal signal,
   in response to an inversion identification signal being at a low level, receive, through the first input terminal, the first internal signal, and in response to the inversion identification signal being at a high level, receive, through the first input terminal, the second internal signal; and
   in response to the inversion identification signal being at the low level, receive, through the second input terminal, the second internal signal, and in response to the inversion identification signal being at the high level, receive, through the second input terminal, the first internal signal;
   or,
   when the first input terminal of the integral unit receives one of the first oscillation signal and the second oscillation signal, and the second input terminal of the integral unit receives another one of the second oscillation signal and the first oscillation signal,
   in response to the inversion identification signal being at the low level, receive, through the first input terminal, the first oscillation signal, and in response to the inversion identification signal being at the high level, receive, through the first input terminal, the second oscillation signal; and
   in response to the inversion identification signal being at the low level, receive, through the second input terminal, the second oscillation signal, and in response to the inversion identification signal being at the high level, receive, through the second input terminal, the first oscillation signal.

4. The memory of claim 3, wherein the logical unit comprises:
   a counter, configured to;
   when the first input terminal of the integral unit receives the first internal signal in response to the inversion identification signal being at the low level and receives the second internal signal in response to the inversion identification signal being at the high level, and the second input terminal of the integral unit receives the second internal signal in response to the inversion identification signal being at the low level and receives the first internal signal in response to the inversion identification signal being at the high level, adjust the at least one of the duty cycle of the first internal signal or the duty cycle of the second internal signal,
   or,
   when the first input terminal receives the first oscillation signal in response to the inversion identification signal being at the low level and receives the second oscillation signal in response to the inversion identification signal being at the high level, and the second input terminal receives the second oscillation signal in response to the inversion identification signal being at the low level and receives the first oscillation signal in response to the inversion identification signal being at the high level, configured to adjust the at least one of the duty cycle of the first oscillation signal or the duty cycle of the second oscillation signal;

a first register group, configured to store a first value of the counter according to an output of the comparator in response to the inversion identification signal being at the low level; and a second register group, configured to store a second value of the counter according to an output of the comparator in response to the inversion identification signal being at the high level.

5. The memory of claim 4, wherein the logical unit further comprises:

an arithmetic component, connected with the first register group and the second register group, wherein the arithmetic component is configured to perform operations of addition, subtraction, multiplication and division on an output of the first register group and an output of the second register group; and a third register group, connected with the arithmetic component, and configured to store an output result of the arithmetic component.

6. The memory of claim 5, wherein the comparison circuit is driven by a sampling clock, a frequency of the sampling clock is lower than at least one of a frequency of the first internal signal or a frequency of the second internal signal, and the frequency of the sampling clock is lower than at least one of a frequency of the first oscillation signal or a frequency of the second oscillation signal.

7. The memory of claim 6, wherein the counter is driven by a calculator clock, a frequency of the calculator clock is lower than the at least one of the frequency of the first internal signal or the frequency of the second internal signal, and the frequency of the calculator clock is lower than the at least one of the frequency of the first oscillation signal or the frequency of the second oscillation signal.

8. The memory of claim 7, wherein the frequency of the sampling clock is the same as the frequency of the calculator clock.

9. The memory of claim 8, further comprising:

a frequency divider, configured to receive an external clock signal, and generate the sampling clock and the calculator clock.

10. The memory of claim 9, further comprising:

a fifth register group, connected with the frequency divider, wherein the fifth register group is configured to configure the frequency of the sampling clock and the frequency of the calculator clock.

11. The memory of claim 1, wherein the comparison circuit comprises:

an integral unit;

a comparator, connected with an output terminal of the integral unit;

a first selector, wherein the first oscillation signal, the second oscillation signal, the first internal signal, the second internal signal, the first external signal and the second external signal are connected with the first selector, and wherein the first oscillation signal and the second oscillation signal are taken as a first differential signal pair, the first external signal and the second external signal are taken as a second differential signal pair and the first internal signal and the second internal signal are taken as a third differential signal pair; and wherein the first selector is configured to select one of the first differential signal pair, the second differential signal pair and the third differential signal pair to be input into the comparator through the integral unit.

12. The memory of claim 11, wherein the control terminal of the first selector is configured to receive a Select Enable Signal (SEL), and select one of the first differential signal pair, the second differential signal pair and the third differential signal pair based on the SEL to be input into the comparator through the integral unit.

13. A memory, comprising:

a clock generation circuit, configured to generate a first oscillation signal and a second oscillation signal, wherein the first oscillation signal and the second oscillation signal have a same frequency but opposite phases, and a duty cycle of the first oscillation signal and a duty cycle of the second oscillation signal are both within a first preset range; and a differential input circuit, configured to receive a first external signal and a second external signal, and generate a first internal signal and a second internal signal; wherein the differential input circuit is further configured to receive the first oscillation signal and a second oscillation signal;

wherein the clock generation circuit is further configured to monitor at least one of a duty cycle of the first internal signal or a duty cycle of the second internal signal, and enable the at least one of the duty cycle of the first internal signal or the duty cycle of the second internal signal to be within a second preset range:

wherein the clock generation circuit comprises:

an oscillation circuit, configured to generate the first oscillation signal and the second oscillation signal:

a comparison circuit, configured to receive the first oscillation signal and the second oscillation signal, and compare the at least one of the duty cycle of the first oscillation signal or the duty cycle of the second oscillation signal; and a logical unit, connected with the comparison circuit and the oscillation circuit, the logical unit being configured to control the oscillation circuit according to an output result of the comparison circuit, so that the duty cycle of the first oscillation signal and the duty cycle of the second oscillation signal are within the first preset range;

wherein the oscillation circuit comprises:

an oscillator, configured to generate a first initial oscillation signal and a second initial oscillation signal, wherein the first initial oscillation signal and the second initial oscillation signal have a same frequency but opposite phases; and a path analog circuit, arranged between the oscillator and the comparison circuit, wherein one terminal of the path analog circuit is connected with an output terminal of the oscillator, another terminal of the path analog circuit is connected with an input terminal of the comparison circuit, and the path analog circuit is configured to simulate circuit characteristics of a first path, receive the first initial oscillation signal to generate the first oscillation signal, and receive the second initial oscillation signal to generate the second oscillation signal.

14. The memory of claim 13, further comprising:

a fourth register group, connected with the oscillator, wherein the fourth register group is configured to configure the frequency of the first oscillation signal and the frequency of the second oscillation signal.

15. The memory of claim 14, further comprising:

a sixth register group, connected with the path analog circuit, wherein the sixth register group is configured to configure electrical parameters of the path analog circuit.

16. A memory, comprising:
a clock generation circuit, configured to generate a first oscillation signal and a second oscillation signal, wherein the first oscillation signal and the second oscillation signal have a same frequency but opposite phases, and a duty cycle of the first oscillation signal and a duty cycle of the second oscillation signal are both within a first preset range; and
a differential input circuit, configured to receive a first external signal and a second external signal, and generate a first internal signal and a second internal signal; wherein the differential input circuit is further configured to receive the first oscillation signal and a second oscillation signal;
wherein the clock generation circuit is further configured to monitor at least one of a duty cycle of the first internal signal or a duty cycle of the second internal signal, and enable the at least one of the duty cycle of the first internal signal or the duty cycle of the second internal signal to be within a second preset range:
wherein the differential input circuit comprises:
a differential amplification circuit;
a second selector, wherein the first oscillation signal, the second oscillation signal, the first external signal and the second external signal are connected with the second selector, and wherein the first oscillation signal and the second oscillation signal are taken as a first differential signal pair, and the first external signal and the second external signal are taken as a second differential signal pair; and
wherein the second selector is configured to select one of the first differential signal pair and the second differential signal pair to be input into the differential amplification circuit.

17. The memory of claim 16, wherein the control terminal of the second selector is configured to receive a calibration enable signal;
in response to the calibration enable signal being at a low level, the first external signal and the second external signal are input into the differential amplification circuit, and in response to the calibration enable signal being at a high level, the first oscillation signal and the second oscillation signal are input into the differential amplification circuit.

* * * * *